US010476406B2

United States Patent
Yokoyama

(10) Patent No.: US 10,476,406 B2
(45) Date of Patent: Nov. 12, 2019

(54) ELECTROSTATIC INDUCTION SYSTEM FOR GLOBAL ENVIRONMENTAL CONSERVATION

(71) Applicant: DAIKYO CORPORATION, Kagoshima (JP)

(72) Inventor: Shoichi Yokoyama, Kagoshima (JP)

(73) Assignee: DAIKYO CORPORATION, Kagoshima (JP)

( * ) Notice: Subject to any disclaimer, the term of this patent is extended or adjusted under 35 U.S.C. 154(b) by 237 days.

(21) Appl. No.: 15/827,227

(22) Filed: Nov. 30, 2017

(65) Prior Publication Data

US 2019/0089270 A1    Mar. 21, 2019

(30) Foreign Application Priority Data

Sep. 16, 2017 (JP) .................................. 2017-194661
Sep. 23, 2017 (JP) .................................. 2017-198030

(51) Int. Cl.
| | |
|---|---|
| H02N 11/00 | (2006.01) |
| B09B 3/00 | (2006.01) |
| G21F 9/00 | (2006.01) |
| B01D 53/32 | (2006.01) |
| C02F 1/28 | (2006.01) |

(52) U.S. Cl.
CPC ......... *H02N 11/002* (2013.01); *B01D 53/323* (2013.01); *B09B 3/00* (2013.01); *G21F 9/00* (2013.01); *C02F 1/283* (2013.01)

(58) Field of Classification Search
CPC ......... B01D 53/323; B09B 3/00; C02F 1/283; G21F 9/00; G21F 9/001; H02N 11/002; B09C 1/00; G21Y 2004/504

(Continued)

(56) References Cited

U.S. PATENT DOCUMENTS

| | | | |
|---|---|---|---|
| 6,214,189 B1 | 4/2001 | Won et al. | |
| 6,632,332 B1 * | 10/2003 | Takaki | B01D 53/8662 204/155 |

(Continued)

FOREIGN PATENT DOCUMENTS

| | | |
|---|---|---|
| JP | H08-029464 | 2/1996 |
| JP | H08-206677 | 8/1996 |

(Continued)

OTHER PUBLICATIONS

Japanese Office Action for 2015-134755 dated Feb. 3, 2016.
Japanese Official Action for 2017-198030 dated Jun. 12, 2018.

*Primary Examiner* — Alex W Mok
(74) *Attorney, Agent, or Firm* — IPUSA, PLLC

(57) ABSTRACT

An electrostatic induction system includes used activated carbon as electron-collecting units, to which electrons are supplied by an electrostatic induction apparatus so that impurities that have been absorbed by activated carbon are neutralized or reduced, and neutralized or reduced used activated carbon is acquired. The neutralized or reduced used activated carbon is buried in an environmental conservation implementation area in such a manner that an amount of the buried neutralized or reduced used activated carbon and a number of locations at which the neutralized or reduced used activated carbon are buried are adjusted depending on a property of the environmental conservation implementation area, and that the buried neutralized or reduced used activated carbon gradually decrease an earthing resistance of the environmental conservation implementation area so as to cause the earthing resistance to have a value less than or equal to 10Ω.

19 Claims, 22 Drawing Sheets

(58) Field of Classification Search
USPC .......................................................... 310/309
See application file for complete search history.

(56) References Cited

U.S. PATENT DOCUMENTS

| | | | | |
|---|---|---|---|---|
| 6,936,994 B1 * | 8/2005 | Gimlan | ................... | B60L 58/40 320/101 |
| 8,710,457 B1 * | 4/2014 | Pamfiloff | ............. | H02N 11/008 250/423 F |

FOREIGN PATENT DOCUMENTS

| | | |
|---|---|---|
| JP | H10-085725 | 4/1998 |
| JP | H10-298970 | 11/1998 |
| JP | 2000-144712 | 5/2000 |
| JP | 2001-152438 | 6/2001 |
| JP | 3277015 | 4/2002 |
| JP | 2003-257695 | 9/2003 |
| JP | 2004-025018 | 1/2004 |
| JP | 2005-005240 | 1/2005 |
| JP | 2005-125177 | 5/2005 |
| JP | 2006-032318 | 2/2006 |
| JP | 2008-186748 | 8/2008 |
| JP | 2009-106263 | 5/2009 |
| JP | 2009-174288 | 8/2009 |
| JP | 2013-164379 | 8/2013 |
| JP | 2014-224696 | 12/2014 |
| JP | 2014-228360 | 12/2014 |
| JP | 2016-120477 | 7/2016 |
| JP | 2017-006893 | 1/2017 |

* cited by examiner

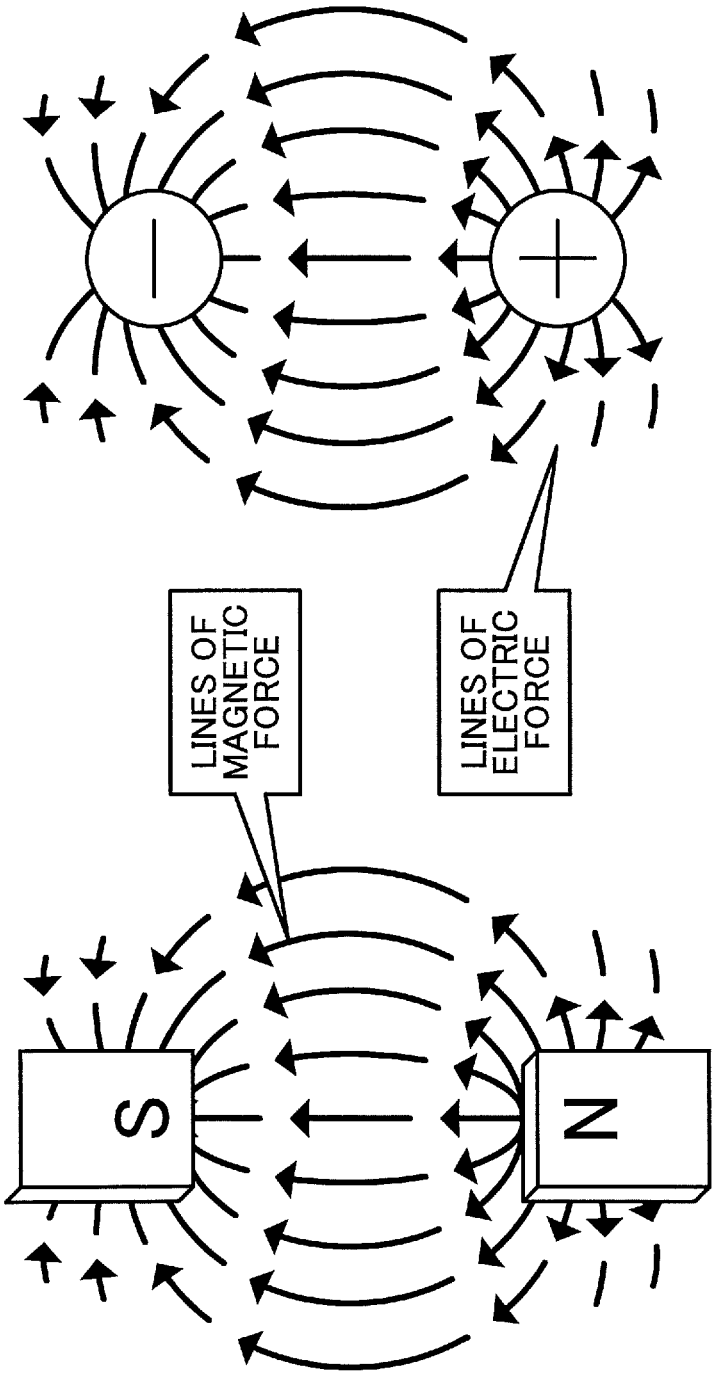

● SUPERIOR POINTS ▲ INTERIOR POINTS ■ NORMAL POINTS

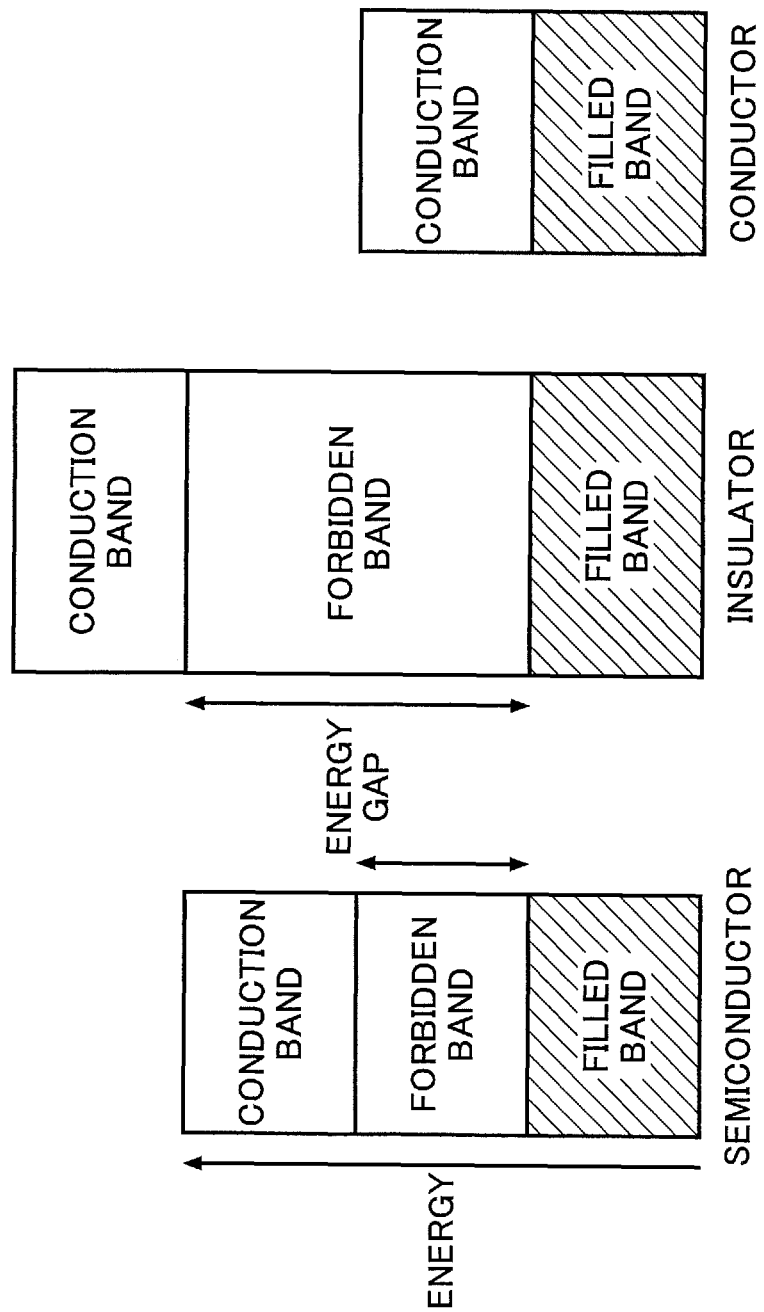

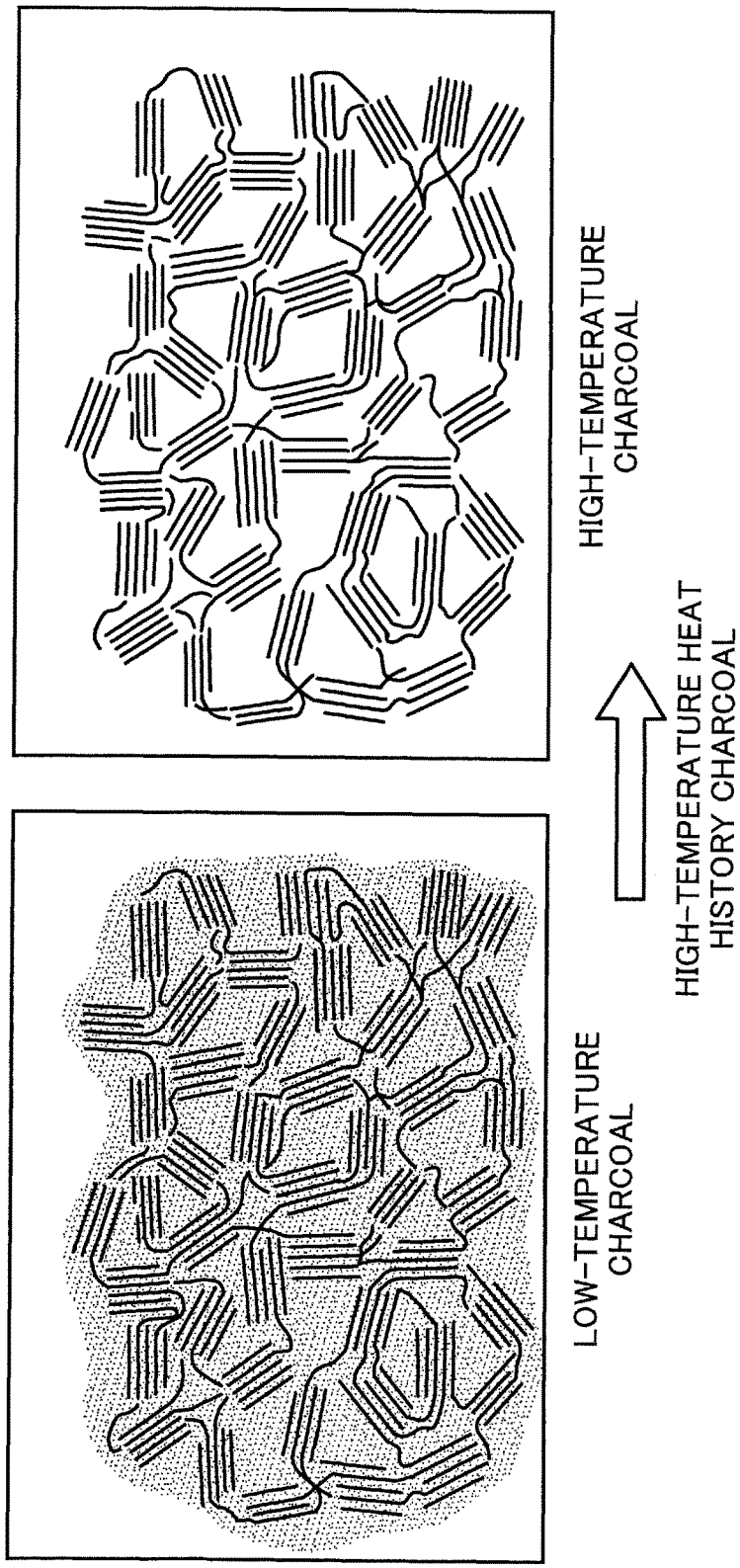

ELECTROSTATIC INDUCTION SYSTEM FOR GLOBAL ENVIRONMENTAL CONSERVATION

BACKGROUND OF THE INVENTION

1. Field of the Invention

The present invention relates to an electrostatic induction system for global environmental conservation.

2. Description of Related Art

The following references disclose related arts.

Patent Reference No. 1: Japanese Laid-Open Patent Application No. 2009-174288 (concerning carbon burying)
Patent Reference No. 2: Japanese Laid-Open Patent Application No. 2009-106263 (concerning carbon burying)
Patent Reference No. 3: Japanese Laid-Open Patent Application No. 2000-144712 (concerning carbon burying)
Patent Reference No. 4: Japanese Laid-Open Patent Application No. 2001-152438 (concerning carbon burying)
Patent Reference No. 5: Japanese Laid-Open Patent Application No. 8-206677 (concerning carbon burying)
Patent Reference No. 6: Japanese Laid-Open Patent Application No. 2016-120477 (concerning radioactive substance neutralization)
Patent Reference No. 7: Japanese Laid-Open Patent Application No. 2014-224696 (concerning radioactive substance neutralization)
Patent Reference No. 8: Japanese Laid-Open Patent Application No. 2013-164379 (concerning radioactive substance neutralization)

SUMMARY OF THE INVENTION

According to an aspect of the present invention, an electrostatic induction system for global environmental conservation includes used activated carbon in a form of electron-collecting units, to which electrons are supplied by an electrostatic induction apparatus so that impurities that have been absorbed by activated carbon are neutralized or reduced, and neutralized or reduced used activated carbon is acquired. The neutralized or reduced used activated carbon is buried in an environmental conservation implementation area in such a manner that an amount of the buried neutralized or reduced used activated carbon and a number of locations at which the neutralized or reduced used activated carbon are buried are adjusted depending on a property of the environmental conservation implementation area, and that the buried neutralized or reduced used activated carbon gradually decreases an earthing resistance of the environmental conservation implementation area so as to cause the earthing resistance to have a value less than or equal to 10Ω.

Other objects, features and advantages of the present invention will become more apparent from the following detailed description when read in conjunction with the accompanying drawings.

BRIEF DESCRIPTION OF THE DRAWINGS

FIGS. 2A-2E, 3A-3C, and 4A-4D illustrate how a lightning strike occurs;
FIGS. 7A and 7B illustrate a material classification with respect to an energy gap size;
FIG. 9 illustrates a change in a crystal with an increase of a carbonization temperature.

DETAILED DESCRIPTION OF THE EMBODIMENTS

The present disclosure relates to an electrostatic induction system for global environmental conservation where, for example, carbon bodies are buried. The carbon bodies are acquired from neutralizing or reducing used activated carbon that has been used, for example, for deodorizing in a water purification process carried out in a water purifying plant. The buried carbon bodies gradually decrease an earthing resistance value there. Thereby, it is possible to increase a very useful electrostatic induction effect.

That is, as a result of reliably decreasing the earthing resistance value into a value close to zero, it is possible to reduce global environmental damages such as lightning strike damages, earthquake damages, landslide damages, radioactive material contamination damages, industrial waste contamination damages, air contamination damages, and so forth.

In addition, in the electrostatic induction system according to the present disclosure, it is also possible to generate electric power with the use of electrons that have been collected at the carbon bodies from space.

Static electricity will now be described.

Figure 1A:
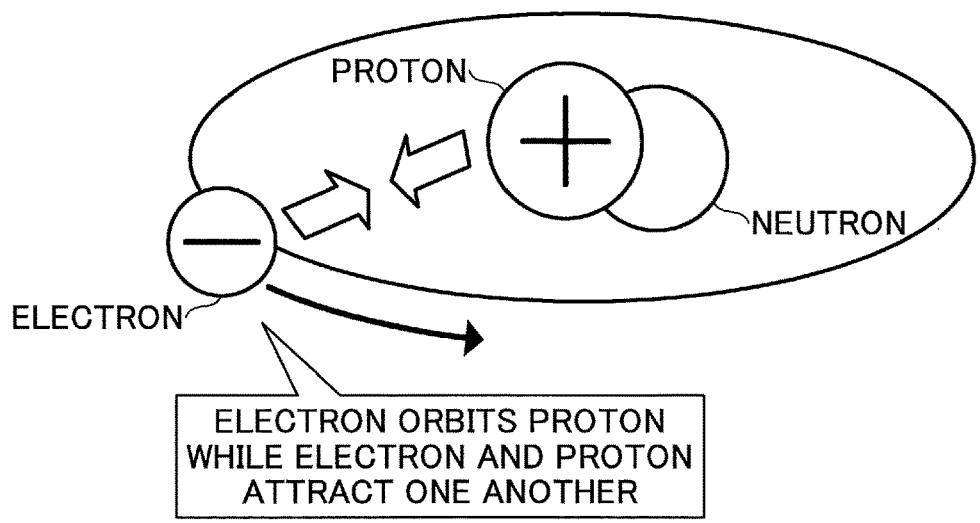
FIGS. 1A-1C illustrate friction electricity.

All objects in nature are collections of atoms, and therefore, have electrons, and have electricity. If the number of protons (+) is the same as the number of electrons (−) in an object, the object is neutral, as illustrated in FIG. 1A.

Figure 1B:
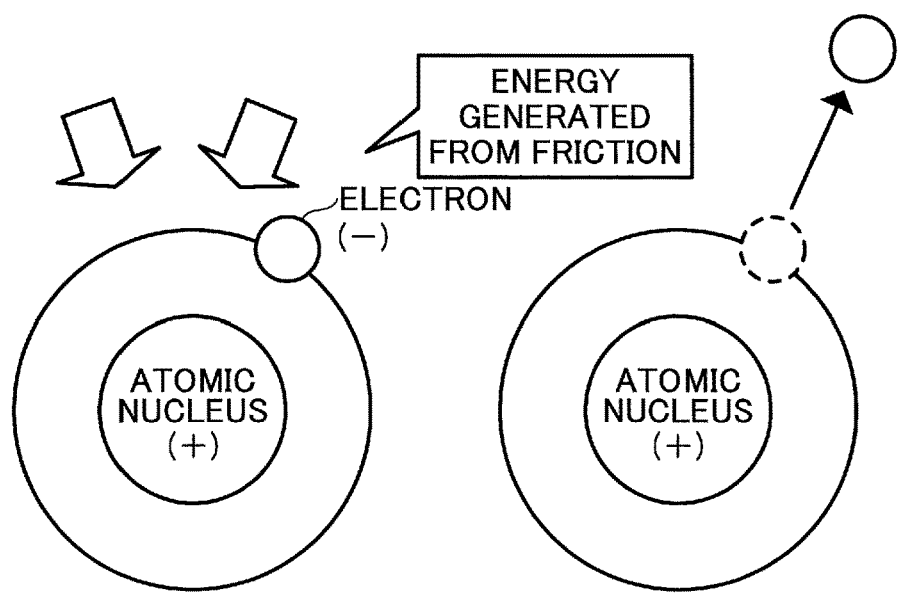

In response to two objects being rubbed with one another, in other words, in response to a friction occurring therebetween, the balance between the protons (+) and the electrons (−) is lost in each of the objects, as illustrated in FIG. 1B. As a result, electrons go out from atoms included in one of the objects. Such a phenomenon that electrons go out is a static electricity phenomenon.

The electrons that go out from the one object move to the other object. In other words, the object from which the electrons are removed is positively charged as a result of negative electricity (i.e., the electrons) being removed (i.e., the object is oxidized). Conversely, in the object that receives the electrons, negative electricity increases, and as a result, the object is negatively charged (i.e., the object is reduced).

Figure 1C:
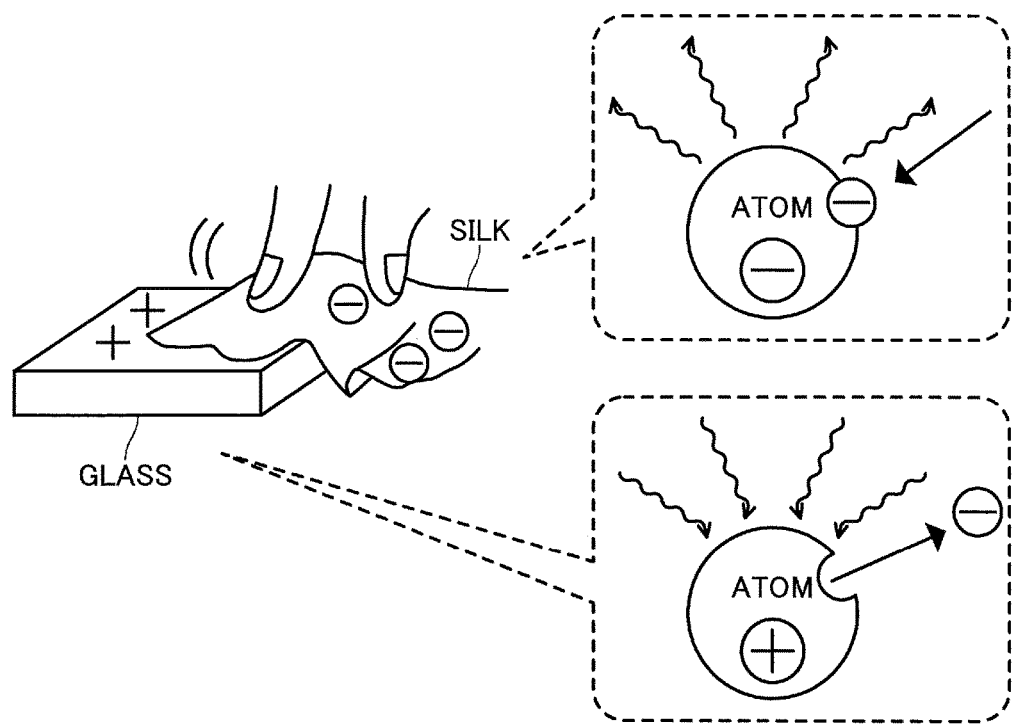

For example, as illustrated in FIG. 1C, in a case where a glass is rubbed with a silk, electrons move to the silk from the glass. As a result, the silk has negative electricity whereas the glass from which the electrons have removed has positive electricity.

A grain in which an electron is added to an atom is called a "negative ion", whereas a grain in which an electron is removed from an atom is called a "positive ion".

Electricity fed from a home socket is dynamic electricity. In contrast to "static" electricity, "dynamic" electricity is electricity where static electricity flows. An electrostatic induction technology is a technology applying "static" electricity.

Actual examples where electrostatic induction appears will now be described.

First, a lightning generation process will now be described with reference to FIGS. 2A-4D.

Figure 2A:
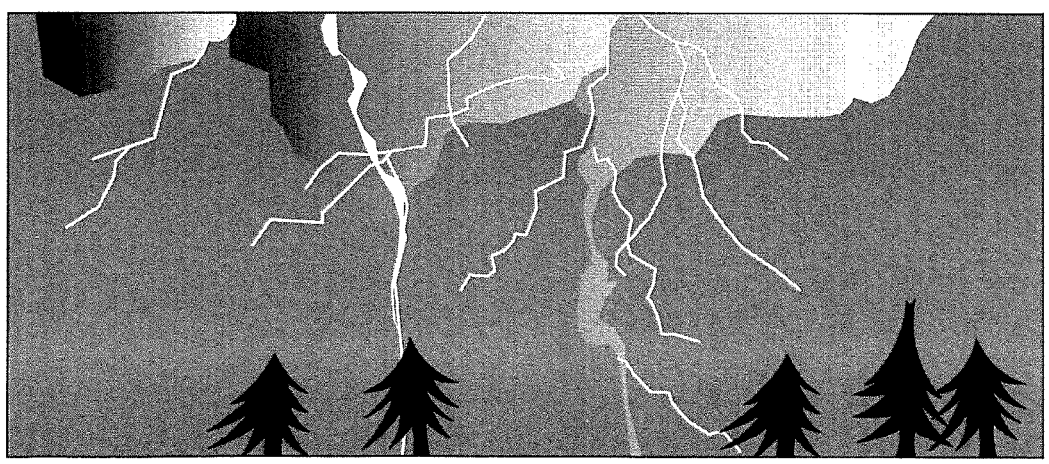
Figure 2C:
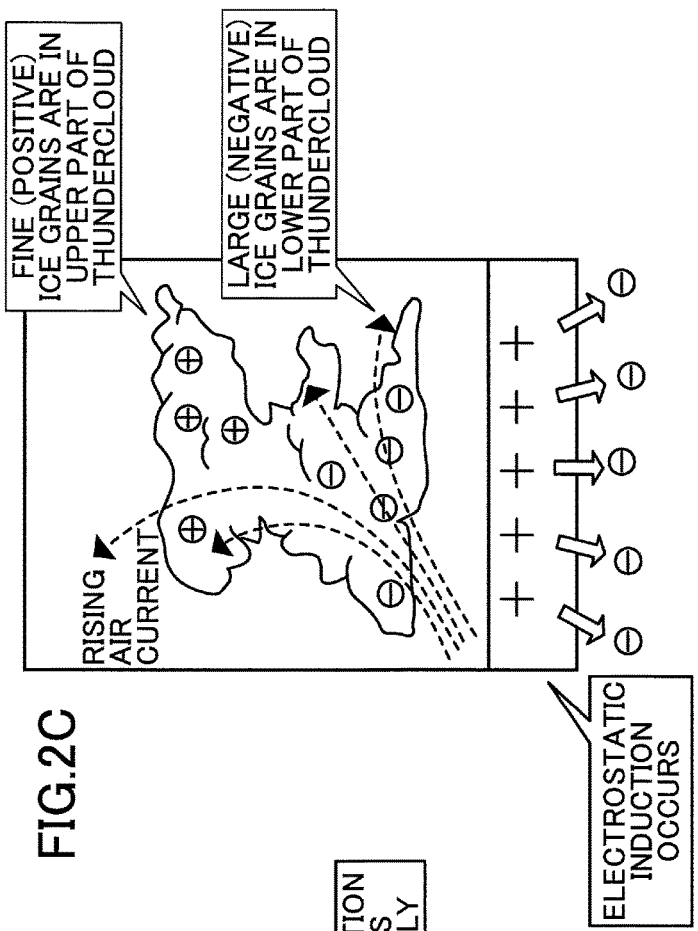
Figure 2B:
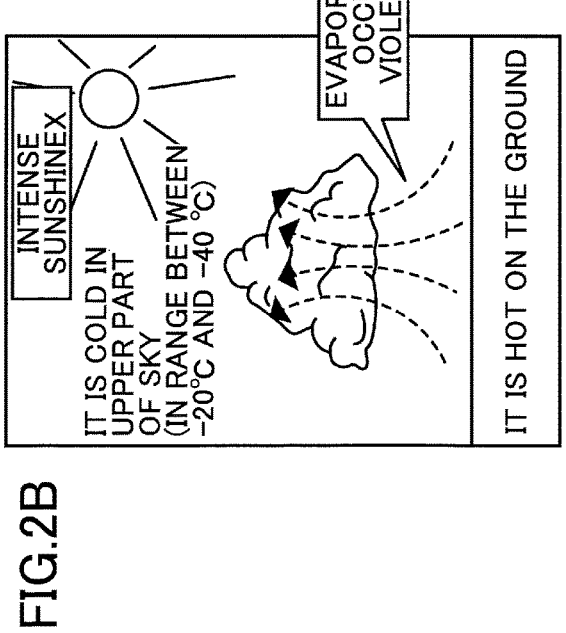

A thundercloud that generates lightning, illustrated in FIG. 2A, is produced as a result of moisture vapor being blown up by an ascending air current, as illustrated in FIG. 2B. At this time, in a high-altitude area, in other words, in a very high part of the sky, cooled water drops become ice grains, which violently hit together and repeat frictions. Through the sequence of processes, friction electricity (i.e., static electricity) is generated.

Among the ice grains charged with the friction electricity, fine ice grains that are positively charged are transported to an upper part of the thundercloud, whereas large ice grains that are negatively charged are transported to a lower part of the thundercloud, as illustrated in FIG. 2C.

As a result of the negative charge being thus accumulated on the lower part of the thundercloud, a great amount of positive charge accumulates on the ground under the thundercloud due to electrostatic induction.

Figure 2E:
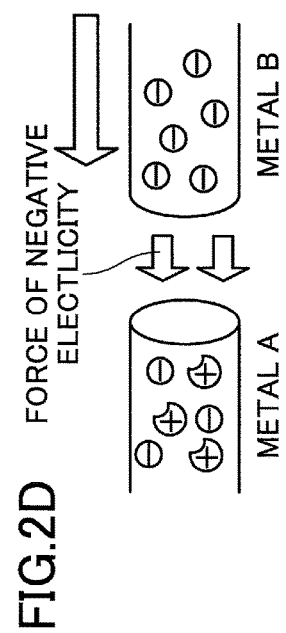
Figure 2D:
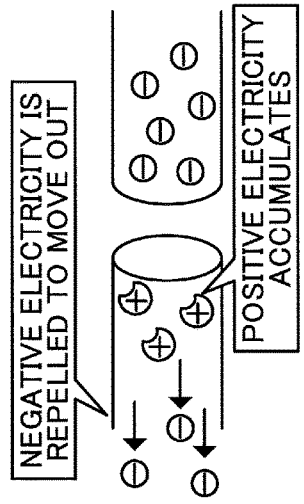

As illustrated in FIGS. 2D and 2E, in response to a metal B that is negatively charged approaching a metal A that is insulated without charge, the metal A is influenced by the metal B. As a result, in the metal A, positive charge accumulates on a portion close to the metal B whereas negative charge accumulates on a portion distant from the metal B.

Because an air that is an insulator exists between the metals A and B, charge does not move therebetween. As a result, a phenomenon called electrostatic induction occurs. Such a phenomenon that an object charged with static electricity causes charge to be generated at a distant object is called electrostatic induction.

Normally, an air that is an insulator exists between a thundercloud and the ground, and as a result, charge does not move therebetween. As a result, electrostatic induction occurs on the ground as a result of being influenced by the thundercloud having negative charge. As a result, electrons on the ground go underground, and thus, positive charge remains near the ground surface.

At this time, an electric potential difference amounting to hundreds of millions of volts appears between the thundercloud and the ground. There, positive charge and negative charge attract each other, whereas charge having the same type of electricity repels each other. Such force is generated at any time as long as there are two types of charge. Such force is called electrostatic force.

As a result of a charge amount increasing, electrostatic force increases, and also, a range to which the electrostatic force influences is widened. Such a range in which electrostatic force is present is called an electric field.

A wider influence of an electric field is caused by a greater charge amount. In other words, the greater a voltage becomes, the wider an influence of an electric field becomes. This means that such a considerably great voltage as hundreds of millions of volts of a thundercloud induces an electric field even at a far-distant ground surface, as illustrated in FIG. 3C.

Figure 3C:
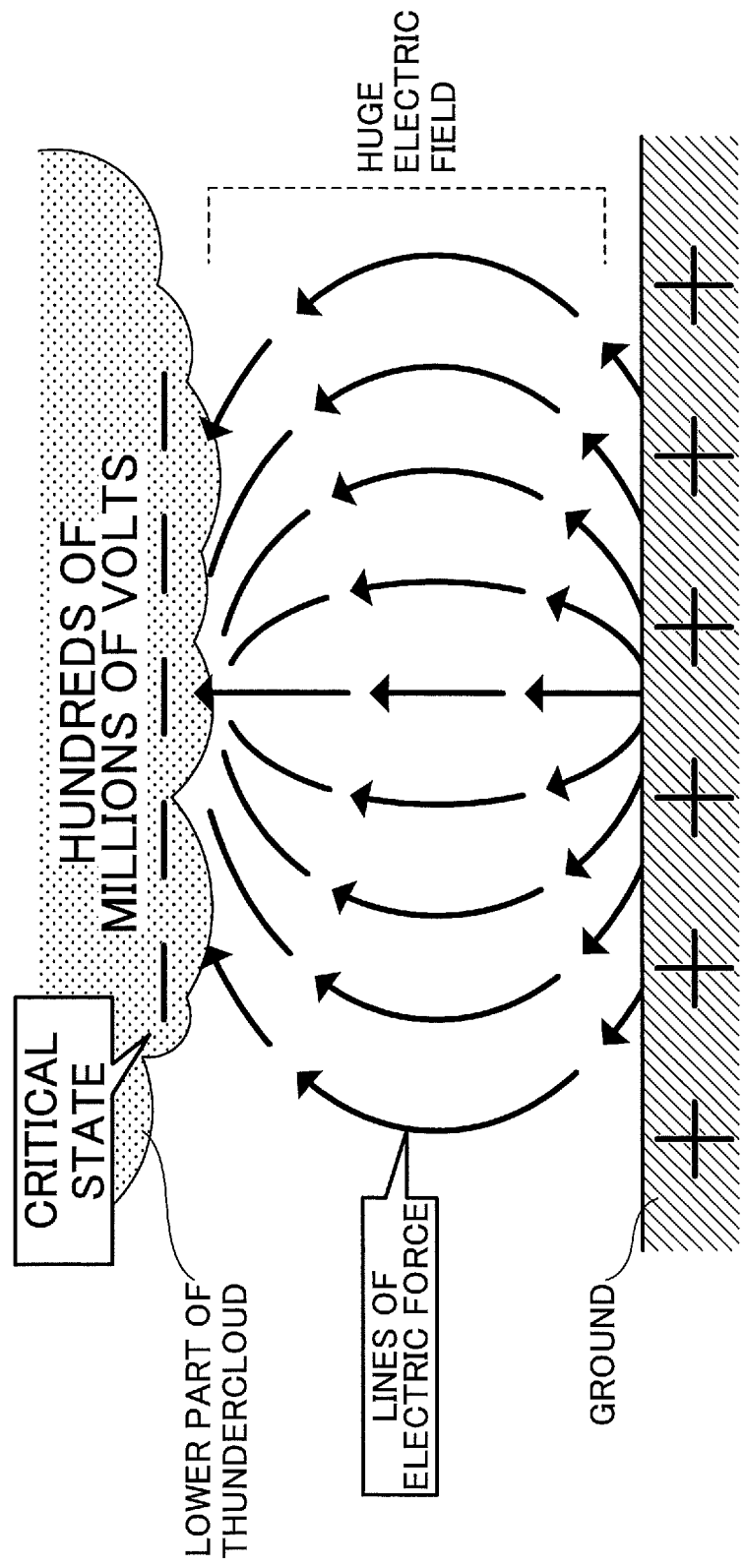

In a state illustrated in FIG. 3C, electrostatic force is applied (i.e., an electric field is generated) between a thundercloud and the ground, and charge has not moved therebetween yet. As illustrated in FIG. 3C, lines of electric force are directed from positive charge ("+" illustrated in FIG. 3C) toward negative charge ("−" illustrated in FIG. 3C).

In an electric field, positive electricity and negative electricity attract one another due to electrostatic force as illustrated in FIG. 3B, similarly to a case where an N polarity magnet and an S polarity magnet attract one another due to magnetic force in a magnetic field as illustrated in FIG. 3A.

Figure 4A:
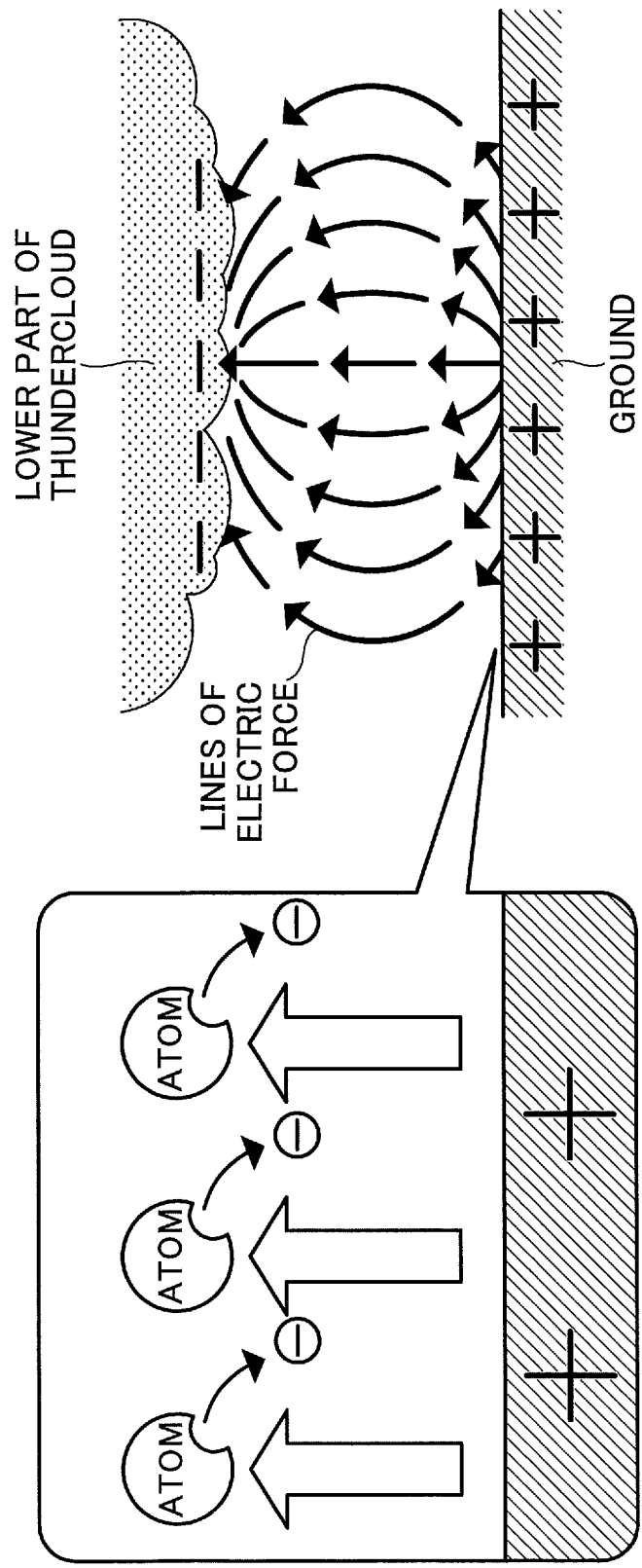

Therefore, in the electric field generated between the thundercloud and the ground as illustrated in FIG. 3C, due to force of the positive charge present at the ground, electrons included in air molecules adjacent to the ground are attracted and forcibly removed, as illustrated in FIG. 4A.

As a result of negative electrons being thus removed, the air molecules enter states of lacking the negative electrons. That is, the air molecules become positive ions. The air molecules thus becoming the positive ions then remove negative electrons from adjacent air molecules to take in, as illustrated in FIG. 4B.

Figure 4C:
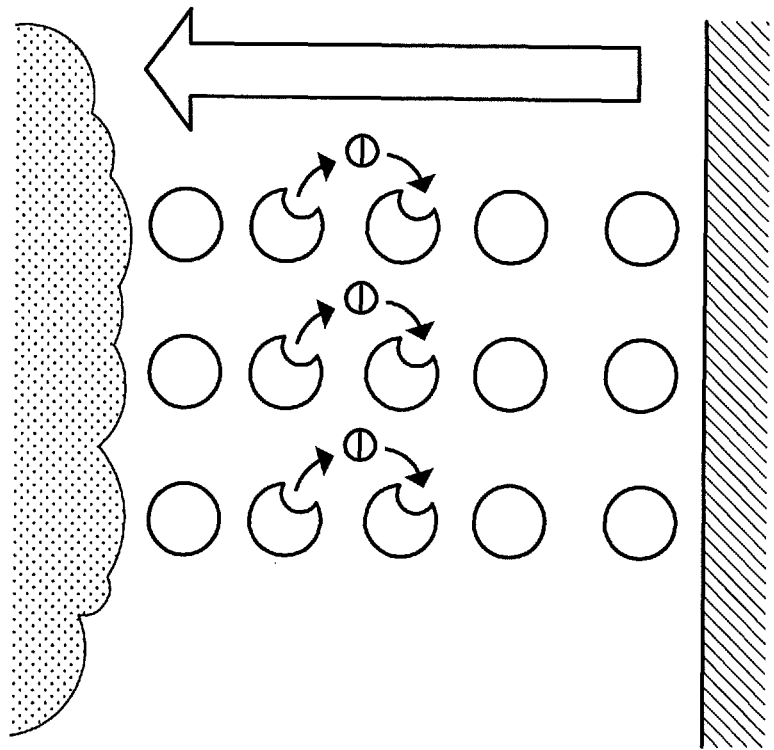
Figure 4B:
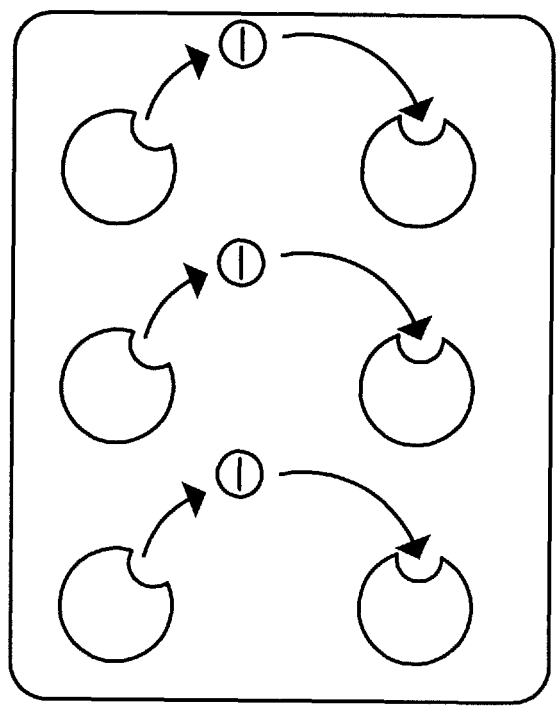

As a result of such a process where electrons move between adjacent air molecules as illustrated in FIG. 4B repeating in sequence in a so-called a bucket brigade manner as illustrated in FIG. 4C, such a channel is completed in the air that positive charge moves from the positively charged ground toward the negatively charged thundercloud through the channel.

Figure 4D:
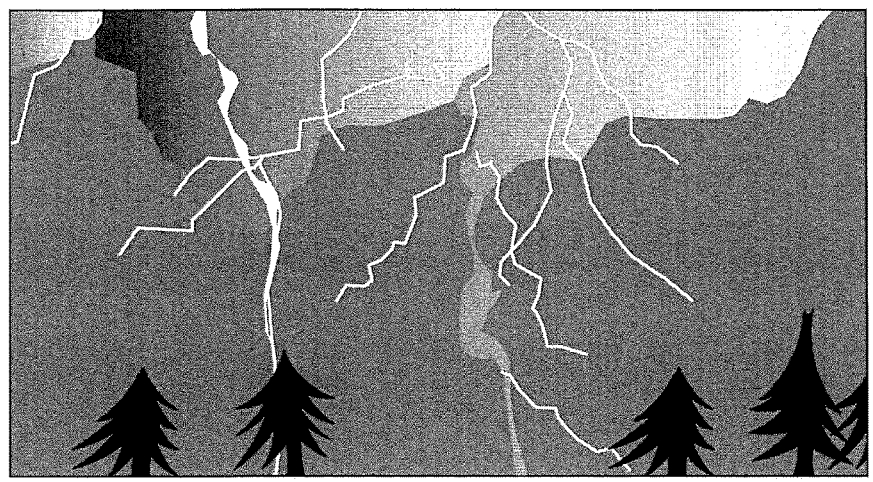

Then, under the condition, negative charge (i.e., electrons) accumulated in the thundercloud moves through the channel and thus are discharged drastically in a manner of a spark discharge through the air that is an insulator. That is, a lightning strike occurs due to the above-mentioned very high voltage, as illustrated in FIG. 4D.

Next, a ground potential will now be descried.

Throughout a wide range of an area, for a geophysical reason, the ground includes a region having a relatively large amount of charge; a region having a relatively small amount of charge; and a region where properties of charge irregularly vary at any time and variable potentials appear.

Among such regional areas, generally speaking, soil of the ground having a negative potential, in other words, a high potential, is, advantageous from a viewpoint of growth of vegetation, and provides an environment of healthy conditions. On the other hand, soil of the ground having a positive potential, in other words, a low potential, is disadvantageous from the viewpoint of growth of vegetation, and provides an environment of unhealthy conditions. Soil of the ground in a region having an electric potential that irregularly varies has inferiority in growth of vegetation.

Figure 5:
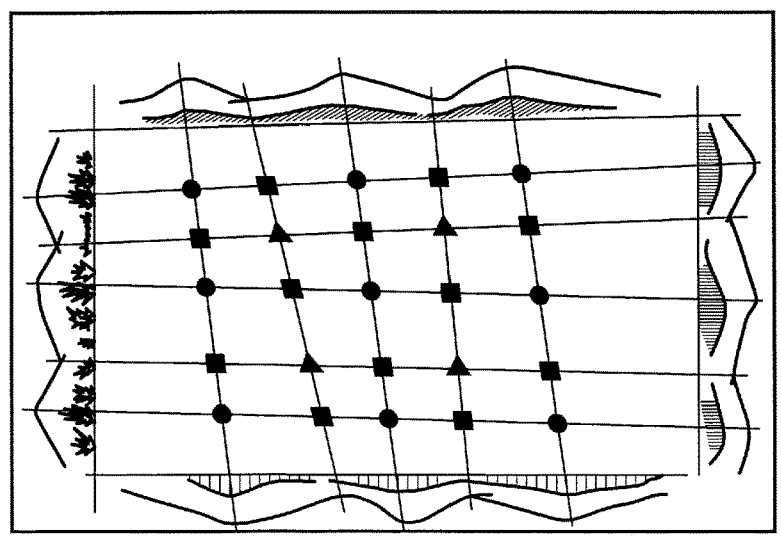
FIG. 5 illustrates intersections of orientation lines.

In this regard, ground potentials were measured with the use of an electric potential meter dedicated for a small voltage at distance intervals of 9 m. As a result, at a place where high-potential orientation lines intersect, a fixedly stable potential difference appears. At a place where low-potential orientation lines intersect, generally speaking, a potential difference value varies at any time and an irregular electric potential difference appears. FIG. 5 illustrates intersections of orientation lines.

In this regard, at a place where low-potential orientation lines intersect, although a road is reinforced by pavement, it may be broken. Also, an upthrusting place or an embankment made of a stone or concrete that is broken is located on an extended line of a low-potential orientation, and, in many cases, is located at a position where low-potential orientation lines intersect.

Further, an unstable arrangement of underground materials causes forcedly multi-directional shaking in a structure on the ground under a complex vibration condition where amplitude of vibrations are not uniform. As a result, locally, a mechanical pressure greater than an earthquake resistant standard may occur. Also, a fire is likely to occur in a building at a place where low-potential orientation lines intersect.

Such estimation may relate to a water capacity of wood or other materials. Also, at a place where low-potential orientation lines intersect, there is a tendency that a building may be dried rapidly in comparison to a fire temperature, and therefore, building materials are under relatively ignitable conditions.

As measures, there is a method of adjusting a ground potential.

Although an electric potential difference between negative and positive potential areas has a very small voltage, the electric potential difference is a factor having an important relationship with physiology of living things, in particular, growth of plants.

In growth of a plant, many essential substances for growth move to and accumulate on electrically positive potential portions as ions to which electrons are added, in the same way as movement of charge. In other words, a portion that luxuriantly grows (i.e., an extending portion) has an electrically positive potential than the other portions.

Thus, as shown in Table 1 below, the greater the electric potential difference from the negative potential is, the more enhanced growth appears.

TABLE 1

| electric potential area | equi-potential area | negative potential area | positive potential area | potential mixed area |
|---|---|---|---|---|
| electric potential difference between root near ground surface and ground surface | between 1.0 mv and 1.5 mv | between 1.2 mv and 2.4 mv | between 0.05 mv and 0.3 mv | between 0.2 mv and 1.8 mv |
| growth degree | very good | excellent | good | no good |
| yield comparison | 100% | between 110% and 115% | between 70% and 90% | between 40% and 60% |

Next, carbon that is a material of an electron-collecting unit 1 according to the present disclosure will now be described.

A large amount of charcoal has been buried under an old temple or shrine. Also, charcoal has been buried, for example, in the underground of the Horyuji temple that the world oldest wood-made building and the grand shrine of Ise that is a representative of Japanese shrines and has weathered for 1300 years.

Also, the Ma-wong-tui ancient tomb was found in 1972 at the suburbs of Changsha city, Hunan, China is said to be one approximately 2100 years old. Then, a dead female body was found from the first tomb thereof. Although the dead body was 2100 years old, the dead body was in the same condition as a dead body approximately 4 days after death.

The estimated death age of the dead body was around 50 years, the body height was 154 cm, there were no damages in the entire body, and the hair had not been aged. The skins and muscles had elasticity, the internal organs remained completely, and the cause of the death was estimated as angina pectoris.

Also, in the stomach, 176 oriental melon seeds considered as being eaten several hours before the death were found and germinated after they were planted.

In fact, approximately 5 tons of charcoal was buried around the first tomb of the Ma-wong-tui ancient tomb. There was nothing other than the charcoal to keep the dead body in the fresh state.

Figure 6:
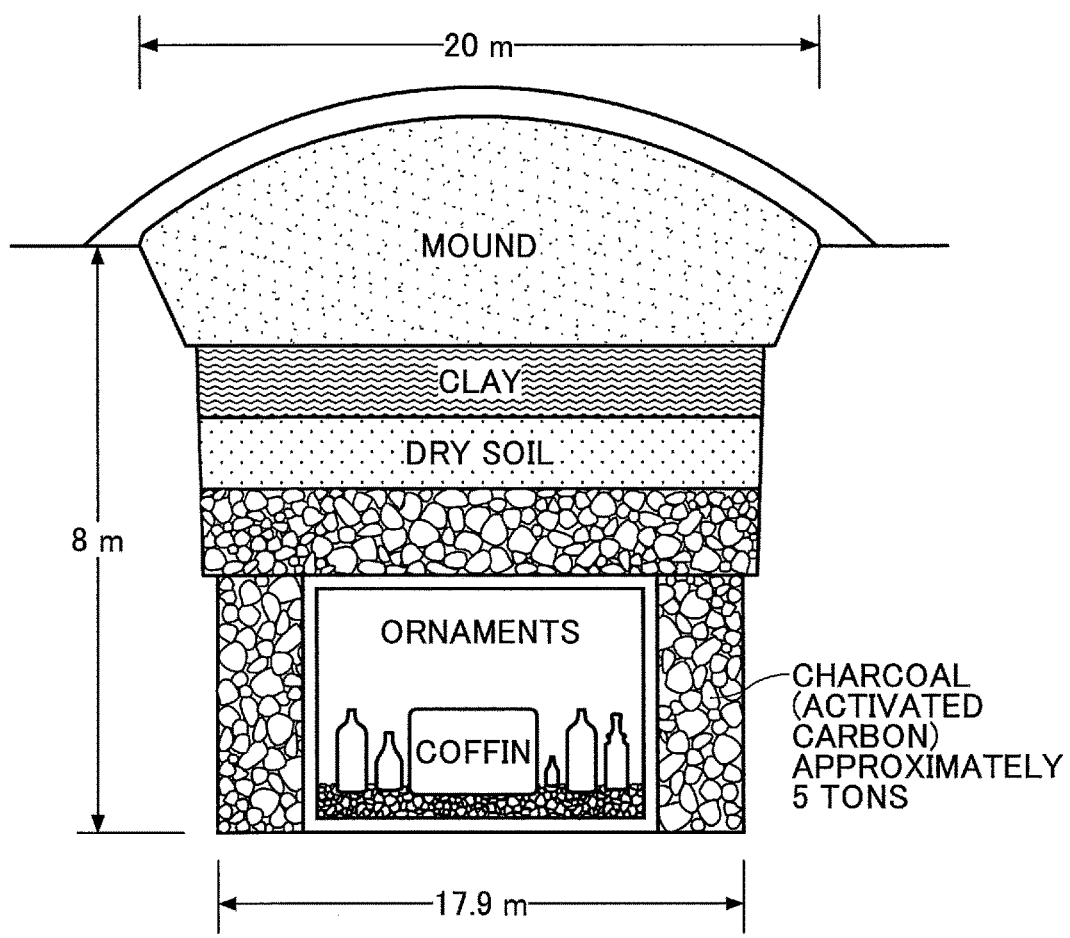
FIG. 6 is an elevational sectional view of the Ma-wong-tui ancient tomb.

FIG. 6 is an elevational sectional view of the Ma-wong-tui ancient tomb.

Normally, there are two cases where a dead body is kept for a long time.

One of the cases is a case of a mummy. A mummy means a dried dead body from which moisture is evaporated under the conditions where there are not putrefactive bacteria.

The other is a case of an adipocere. An adipocere means a dead body that has entered a state where the subcutaneous fat of the body has come to be like soap in water or in soil having a high humidity.

However, the dead body in the Ma-wong-tui ancient tomb did not correspond to any of these cases.

The fact that the dead body had been kept as it was even for 2100 years neither as a mummy nor as an adipocere was the first time in the history, and the reason why the dead body could have been kept has not been sufficiently explained.

Figure 7A:
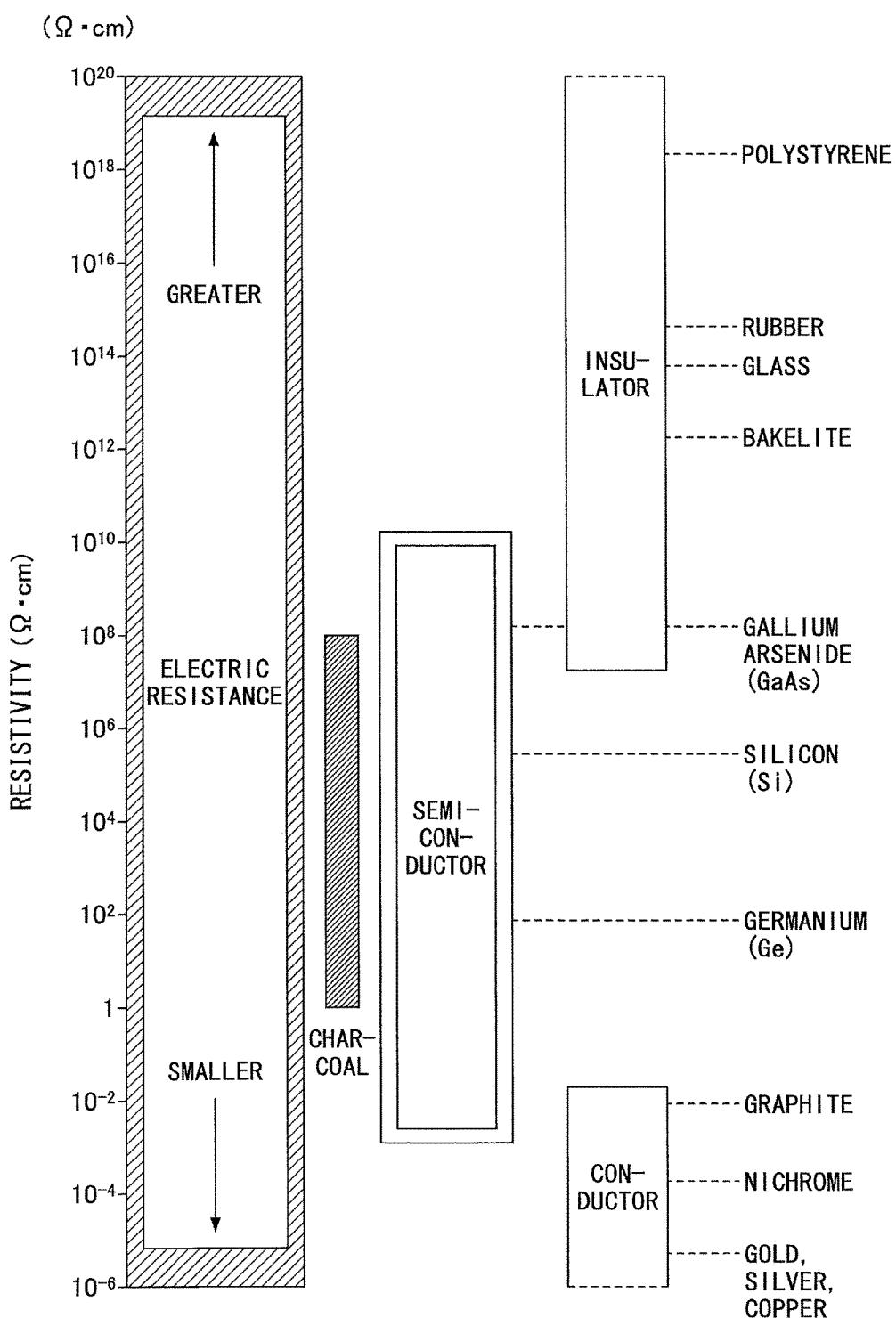

Generally speaking, substances can be generally classified into three, i.e., conductors, semiconductors, and insulators from a viewpoint of their electrical resistivity, as illustrated in FIG. 7A.

A conductor has resistivity on the order in a range between $10^{-6}$ $\Omega$·cm and $10^{-2}$ $\Omega$·cm. A semiconductor has resistivity on the order in a range between $10^{-3}$ $\Omega$·cm and $10^{10}$ $\Omega$·cm. An insulator has resistivity on the order in a range between $10^{7}$ $\Omega$·cm and $10^{20}$ $\Omega$·cm.

Charcoal falls within the range of a semiconductor of FIG. 7A.

At time of producing charcoal, as a result of a carbonization and dry distillation temperature being gradually increased, the electrical resistivity decreases. Especially, a remarkable variation point occurs around 650° C., and then, the resistivity falls sharply. Also, this phenomenon is not greatly affected by the tree species.

Table 2 below illustrates a measured result of relationships between a carbonization history temperature and electrical resistivity where thinned wood of Japanese cedar was used.

TABLE 2

Relation between carbonization temperature and resistivity

| carbonization temperature (° C.) | resistivity (Ω · cm) | note |
|---|---|---|
| 310 | $10^9$ | brown |
| 450 | $10^6$ | black |
| 600 | $10^4$ | black |
| 800 | $10^1$ | black (glossy) |
| 900 | $10^0$ | black (glossy) |
| 1000 | $10^{-1}$ | black (glossy) |

A reason why high-temperature heat history charcoal having electrical resistivity that is as small as possible is needed is that, in such a type of charcoal, a free electron group (n electrons) can excite in carbon with smaller nonthermal energy.

As a result of a wood material being heated under the environment of not having oxygen, decomposition of respective components gradually starts, i.e., components of hemicellulose gradually start being decomposed from around 250° C. and components of cellulose gradually start being decomposed from around 280° C. Then, from around 300° C., the decomposition progresses exponentially. Then, from around 400° C., a decomposition progress draws a gentle curve. However, a decomposition progress of a lignin component of a hydrocarbon system draws a curve that is approximately a straight line between around 350° C. and around 1000° C.

Figure 8C:
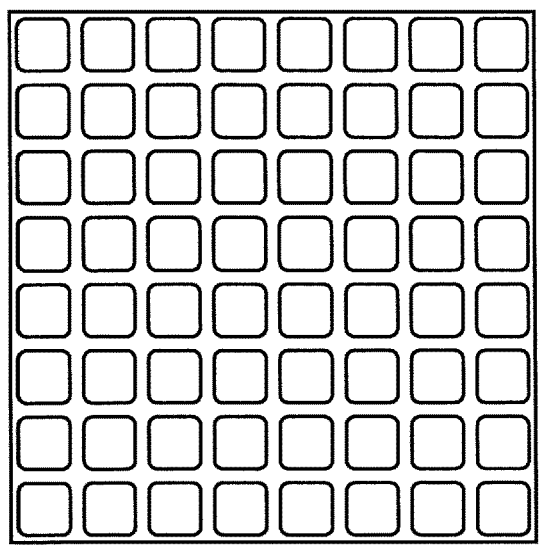
FIGS. 8A-8C illustrate states of a crystal.
Figure 8B:
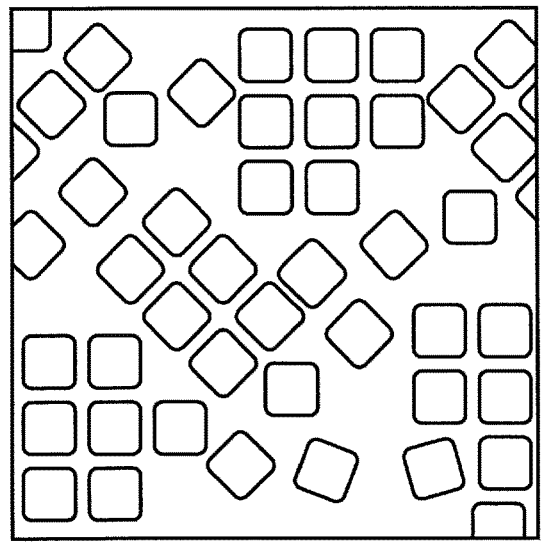
Figure 8A:
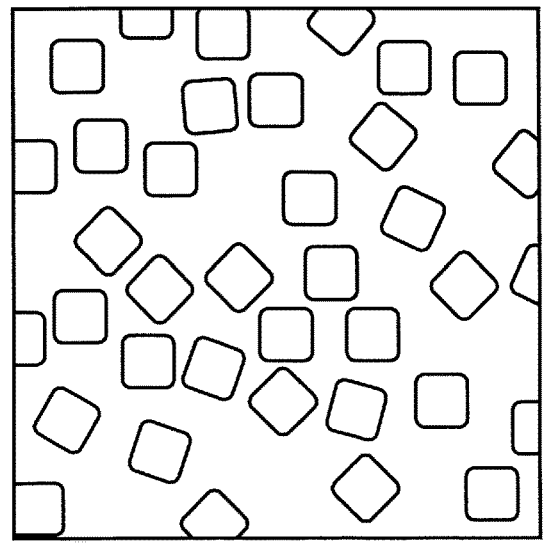

Speaking of these phenomena from a crystal structure viewpoint, it is considered that, with a temperature increase, an amorphous lignin component is removed, and a typical steric turbostratic 6-membered ring structure is acquired. Generally speaking, substances are classified into amorphous (see FIG. 8A), polycrystaline (FIG. 8B), and single crystal (FIG. 8C) from a viewpoint of their aggregate states.

In case of charcoal, a state changes as illustrated in FIG. 9 with an increase in a carbonization temperature.

That is, with an increase in a carbonization temperature, a lignin component between graphite microcrystallites is decomposed, and also, a reaction of the graphite microcrystallites themselves reducing in their sizes continues.

However, only polycrystallization progresses and monocrystallization does not occur, even after various general conditions are satisfied, for reasons that a raw material of charcoal is a living body and includes various mineral components and so forth; carbonization causes a more porous structure; there are vertical and horizontal fine passages inside; and so forth.

If monocrystallization occurs, charcoal may be applied to various industrial materials. The reason why charcoal has not been fully used may be that its microcrystalline structure is a polycrystalline structure.

However, along with a progress of research concerning semiconductor applied to electronic circuits, the drawback has become a great advantage.

That is, as a result of a high-temperature heat history being given to charcoal, the electrical resistivity further increases. This results in a reduction in an energy gap of FIG. 7B, i.e., a reduction in a height of a forbidden band, and results in that a n electron group in charcoal can excite with very weak energy, for example, a ground earth current, a ground electromagnetic wave, or the like. In addition, in response the electron group exciting, its level inevitably falls.

At this time, because high-temperature heat history charcoal is a typical polycrystaline material, a voltage slope of the level of the electron group falling has an uneven shape, and thus, a very large amount of the electron group can be stored during the process of the level of the electron group falling.

As a result of the large amount of electrons being thus stored in the charcoal, the charcoal group is negatively charged. Therefore, an electric potential difference occurs between the surroundings that generally have a ±O electric potential and the charcoal group.

Next, functions of static electricity will now be described.

(1) Functions concerning a crystal as force of combining and arranging atoms or molecules:

Increasing brightness of jewels; increasing sharpness of knives or the like; preventing soles of shoes from being worn away; and so forth (2) Determinant functions concerning chemical changes of substances:

Important factors concerning oxidization and reduction (3) Functions concerning processes based on ionization of substances such as dissolution of solvents, dispersion of colloids, and so forth:

Functions of water retentivity, force of osmosis, and so forth acquired as a result of an influence being exerted on water molecules, and so forth (4) Functions concerning processes of diffusion, penetration, dialysis, and so forth of substances:

Functions relating to water retentivity, force of osmosis, and so forth acquired as a result of an influence being exerted on water molecules, and so forth, the same as above (5) Functions concerning processes of radiation of substances such as light, color, heat, and so forth:

Functions of reducing oxidation of tempura oil, and so forth (6) Functions concerning processes of absorption, attaching, contact, and so forth of substances; in particular, effects of catalysts:

Functions of durability of deodorants, and so forth.

(7) Physiological functions based on phase waves in living bodies:

Functions of reducing injured portions in living bodies, hypofunction portions in living bodies, and so forth (8) Functions concerning weathers such as fogs, rains, and so forth (concerning a principle of the present disclosure)

A cloud is generated from an ascending airflow from the ground or the sea of the earth. From another viewpoint, a solar stoim increases due to solar flare generation, and a huge amount of electrons and protons are stored along the geostationary orbit of the earth. As a result of electrons along the geostationary orbit being saturated, electrons move to the ground. As a result, polarization occurs inside the cloud. That is, an upper part of the cloud has positive electricity, while a lower part of the cloud has negative electricity. Thus, a weather phenomenon has a great relation to activity of the sun.

A precursor phenomenon of an earthquake or a tsunami is estimated as an electron wave.

In past disasters, some weather phenomena (earthquake clouds) or abnormal behaviors of small animals occur in many cases before actual earthquakes or tsunamis. Thus, disaster does not occur suddenly without precursor.

Assuming that an electron wave induces a disaster, a preventive effect can be sufficiently acquired as a result of an electron wave being absorbed by an electron-collecting unit, and thus, being reduced.

As measures against disasters, it can be considered that an electron-collecting unit is buried around an atomic power generation plant that is adjacent to seashore, or an electron-collecting unit is buried in the seashore.

Although a mechanism of an earthquake phenomenon or a tsunami phenomenon has not been completely explained yet, a forecast would be able to be made after such a phenomenon had been explained. However, confrontation with natural marvels will be made as much as possible, and it is considered that a disaster forecast could be made possible through a development of a new measurement method.

A spin angular motion of an electron in an atomic structure exhibits a phenomenon concerning coupling of substances or crystallizability, and an orbital angular motion of an electron exhibits a phenomenon concerning a magnetic property of a substance. Thus, various physical properties are determined in connection with crystallizability and magnetic properties.

From the above-mentioned process of lightning generation, it is seen that positive charge accumulates on the ground at a time when a rain or a cloud is generated. In order that the thus positive charged ground surface will be stabilized, the ground surface takes in electrons from the atmosphere or from the air on the ground.

Therefore, it is estimated that the ground at a time when a rain or a cloud is generated takes in electrons from animals and/or plants. If electrons are thus removed from animals or plants, oxidation phenomena occur. This point may relate to phenomena that a person having a back problem appeals his or her bad feeling especially before weather gets worse.

Therefore, it is expected that, by burying an electron-collecting unit, the positive ground surface can be neutralized, and thus, it is expected that the following advantageous effects can be acquired.

(1) Extermination of Harmful Insects:

An environment that harmful insects such as termites prefer is an oxidized environment. Therefore, as a result of an environment being neutralized or reduced continuously, they cannot live there.

(2) Countermeasure Against an Odor that is Unique to a New Building:

Places where waste materials are buried, new building materials, wall paper, adhesives, and so forth generate bad smell. Such oxidized objects that generate bad small are reduced.

(3) Countermeasure Against Equipment that Generates an Electromagnetic Wave:

Generation of an electromagnetic wave from personal computers, copiers, telephones, TV sets, and so forth, is avoided.

(4) Countermeasure Against Fires:

It is possible to determine an advantageous effect of an electron-collecting unit by comparing water retentivity measured at a place where an electron-collecting unit is buried with water retentivity measured at a place where an electron-collecting unit is not buried.

(5) Countermeasure Against Lightning Strike Damage:

As a result of a neutralized or negative state of a ground surface being able to be continuously maintained, the ground surface need not remove electrons from the atmosphere even if a thundercloud is generated, and electric lines of force are not generated, and thus, it is possible to avoid a lightning strike.

(6) Countermeasure Against a Disaster:

For example, a landslide phenomenon is caused by a reduction in binding force between soil grains. Note that a construction of a slope itself has a problem for a region having a steep soil slip angle. However, by taking a measure to increase a binding force between soil grains, it is possible to almost solve the problem.

Electrons increase a binding force between soil grains. By burying an electron-collecting unit, more specifically, in such a manner that electron-collecting units are buried in a landslide dangerous zone at intervals of 20 m, it is estimated that elections are supplied to soil grains that have reduced binding force, and occurrences of landslides can be reduced.

(7) Measures Against Earthquake:

In some cases, phenomena same as or similar to those occurring in a case of thundercloud generation occur as earthquake precursor phenomena.

Below, classifications of earthquake precursor phenomena will be illustrated.

(1) Phenomena Occurring Several Hours or Several Days Before an Earthquake:

Atmospheric phenomena (an earthquake lightning, earthquake cloud, an earthquake fog, abnormality in the moon or abnormality in a starlit sky)

Abnormality in animals (escaping from an earthquake center, an abnormal agitation, getting up from a winter sleep, intergrowth, lining up, panic, dying of shock)

Abnormality in plants (abnormal flowering, blighting, swaying, closing of mimosa's leaves)

Electromagnetic abnormality (an earth current, an earthing resistance, an electric wave generation and propagation failure, electric equipment malfunction, poor reception of a TV set or a radio set)

Groundwater and hot spring water (water level, temperature, fluctuation of radon concentration, white turbidity)

(2) Phenomena Occurring Due to Rock Fracture or Fault Activity (Earthquake Lighting, Electromagnetic Abnormal Phenomena)

Figure 10:
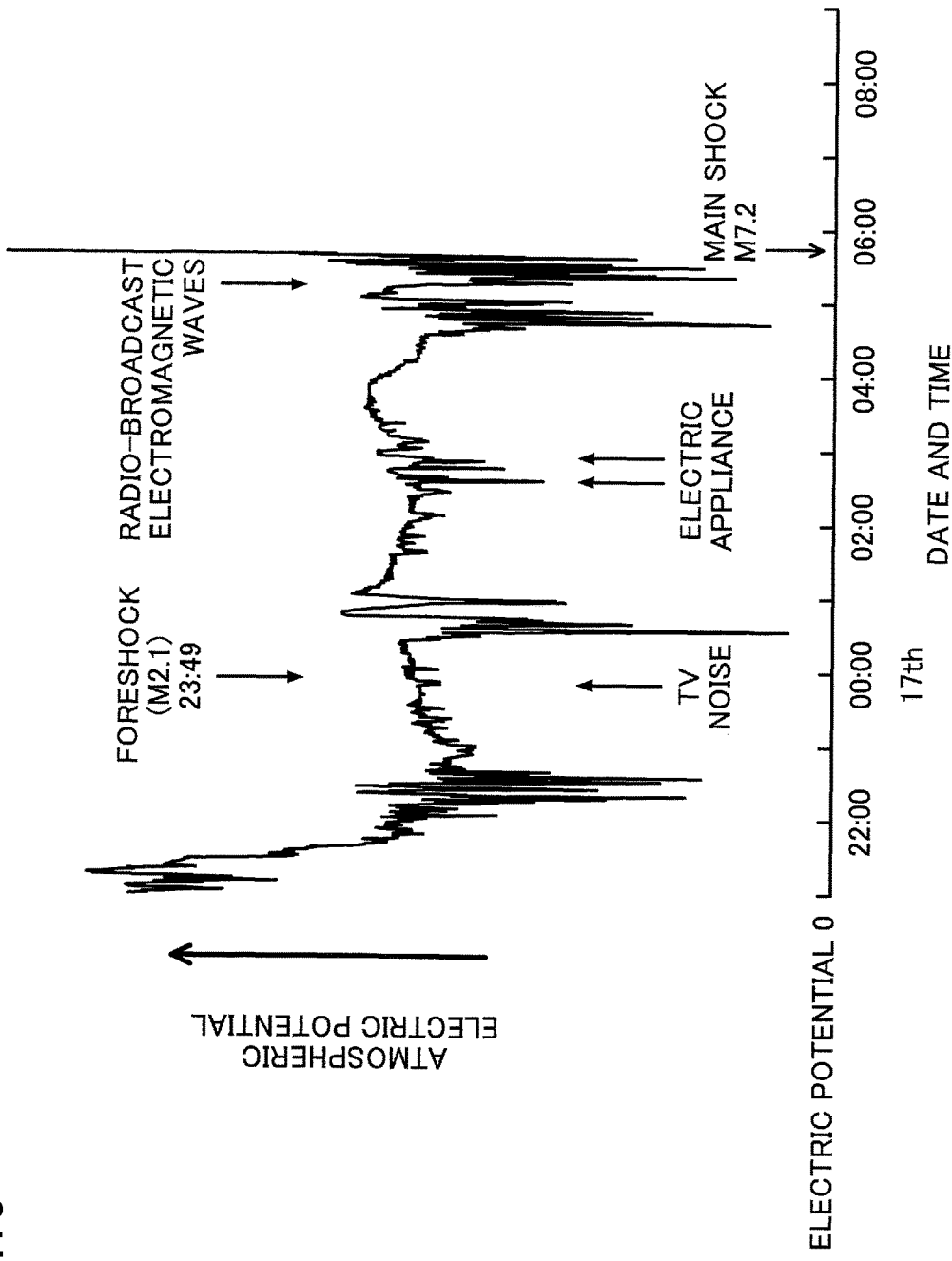
FIG. 10 illustrates electrostatic fields before and after the Kobe earthquake.

Below, earthquake precursor abnormal behavior of familiar animals will be illustrated.

Human: feeling bad, headache, being hysteric, ear ringing, same symptom as that occurring at a time of whether worsening Dog: barking, looking worried, complaining, barking sadly, biting a person, same behavior as that occurring immediately before thundering, being noisy as if an enemy occurs nearby, being frantic Cat: mewing sadly, behaving violently, leaving home, taking a kitten out, climbing a tree

Mouse: being noisy, disappearing, panicking one hour earlier, being absent-minded

Crow: being noisy in crowds, cawing, disappearing

Seagull: flying in an inland area, being noisy in the sky

Chicken: cackling in the night, being noisy, flying up to a roof or a tree, not entering a coop

Parakeet: cawing with high-tone voice, flapping even in the night, flying and being noisy

Snake: being on the ground even in winter, coiling itself, being crowded, agglomerating, wriggling, flocking in a thicket in summer Fish: being drawn up, jumping out of water, behaving violently, floating with its white belly up, being dead, hiding, a deep-sea fish appearing, not feeding itself, an abnormally big catch, a poor catch, a seawater fish going upstream, a shoal of eels appearing on the shore, a catfish being wildly frantic Earthworm: many appearing on the ground, agglomerating

Immediately before the Kobe earthquake, the Kobe Electromagnetic Wave Laboratory measured naturally generated static electricity. FIG. 10 illustrates officially announced temporal transition data of a static electricity amount.

Immediately before the earthquake, a charge amount varies greatly. By also considering phenomena occurring at a time when precursor abnormality occurred, an interesting point can be seen.

That is, it is considered that, due to frictions of active faults, the earth crust entered a powerful positive-ion state, electrons are thus removed from the inside of the earth crust, and the influence was applied also to humans, animals and plants. Further, an influence of other factors such as an electromagnetic wave and so forth can be strongly estimated.

In this regard, whether it is possible to prevent an earthquake by burying electron-collecting units should be determined from various viewpoints through future experiments. It is necessary to carry out measurement of ground electric potentials for a long term assuming earthquakes.

Thus, application of static electricity to a wide range of fields based on the present disclosure is expected.

Next, causes of lightning strikes will now be described.

At a time of generation of a thundercloud, a huge electrostatic field is formed in the atmosphere. At this time, a great amount of electrons on the ground surface go underground. In other words, the ground surface enters an oxidized state that is an unstable state.

It is necessary for the ground surface to remove electrons from all the substances on the ground to stabilize (to be neutralized or reduced). In response to electrons being thus removed from the ground surface, humans and animals come to have bad feelings such as headaches, backaches, or the like.

Then, finally, atoms on the ground remove electrons a small amount of which is included in the atmosphere that is normally an insulator. At a time when such a phenomenon that electrons are thus removed has reached a lower part of the thundercloud, electric lines of force are connected between the ground and the thundercloud. Thus, a huge electric discharge (lightning strike) occurs.

Next, causes of an earthquake will now be described.

A substance includes atomic nucleuses, and electrons turn around each atomic nucleus. If force is applied to a substance, electrons go out from the substance. If a great electrostatic field is formed in the atmosphere, electrostatic induction occurs on the ground, and a great amount of electrons go underground. The electrons thus having been underground are estimated as going toward active faults, magmas of volcanos, and unstable stratums.

Further, electrostatic induction occurs also in active faults, magmas of volcanos, and unstable stratums. As a result, active faults may shift, and volcano activity and stratum activity may be influenced.

In other words, as a result of a lightning strike occurs on the ground, similar phenomena occur in the earth crust. As a result, it is estimated that movement of electrons propagates as a wave, and the wave change their form into a P-wave and an S-wave at a time of an earthquake.

After a wave of electrons reaches electron-collecting units, it is estimated that the wave disappears or decreases there accordingly.

According to the Geographical Survey Institute, "Japanese islands are compressed due to plate movements. Due to force of pressing together, lock layers in land plates on which the Japanese islands are placed are broken and shifted. As a result, "an inland-type earthquake" occurs. This earthquake occurs at a swallow position approximately in a range between 5 km and 20 km underground. Therefore, the earthquake brings a heavy damage to our lives".

There are active faults exposed to the ground surface. Movement of electrons on the ground may thoroughly affect active faults.

A state where a substance is stable means a state where the substance is neutralized or reduced and binding force in the substance is strong. In contrast, a state where a substance is not stable means a state where binding force in the substance is weak, and may be easily broken against a friction or an impact.

In response to a friction or an impact being applied to a substance, electrons inevitably move, and, therefore, an active fault becomes an unstable active fault.

In response to electrons moving to an active fault, a lightning strike that occurs in the atmosphere occurs also in an active fault and a lock layer. In this regard, in the atmosphere, a lightning strike occurs approximately straightforwardly because there are few obstructions. In contrast, in the earth crust, it is estimated that lightning propagates as an electron wave.

Next, an influence of static electricity to human body will now be described.

A substance includes atomic nucleuses, and electrons turn around each atomic nucleus. If force is applied to a substance, electrons go out from the substance. For example, if a human is injured, or a hand is hit, electrons are discharged from a wound. An electric potential occurring at the wound is called an injury potential.

Because electrons are removed from the hit portion, the portion is oxidized, and changes its color into purple. The hit position attracts electrons from a surrounding space to stabilize.

On the ground surface, a huge electrostatic field is formed naturally. Even in a case where a lightning strike as in a thunderstorm does not occur, natural thunders occur on a daily basis.

Next, neutralization of an industrial waste, an animal industry base, a contaminated sea area, a radioactive substance, and so forth will now be described.

Industrial waste discharge of Japan is estimated as approximately 392,840,000 tons in 2014. It is estimated that industrial waste discharge all over the world is immeasurable. In this regard, it may be considered that removal of contaminated materials improves an environment. However, in fact, improvement of a circulation system should be implemented.

For example, as a result of supplying a large amount of nitrogen fertilizer for cultivation and supplying too much amount of animal food to digest in order to acquire a high-quality tea and in order to supply an excessive amount of animal food to promote cattle and pig cultivation, supplying a large amount of nitrogen fertilizer for cultivation and supplying too much amount of animal food to digest may result in contamination with filth. Consequently, a nitrate nitrogen concentration included in ground water for drinking and farm products tends to increase year by year, and therefore, even ensuring safe drinking water and ensuring food may become doubtful.

In other words, it is important to consider a circulation system from the atmosphere through the earth crust. The above-mentioned nitride circulation closely relates to water circulation as an important circulation. If only contamination materials are considered, an overall circulation may be missed.

A critical feeling may be needed to have for a point that a steep increase in the world population and development of cultural lifestyle habits may finally influence the entirety of a global environmental balance, and may result in recent crustal changes, volcanic activities, and fluently occurring wind and flood damages.

This is the same also for an influence of radioactive substances. The Fukushima nuclear power plant accident is problematic not only for Fukushima. Countermeasures against the same type of problems should be taken on a global basis.

Instead of giving up trying to solve the problems due to the problems being caused by phenomena inside atomic nucleuses, it is necessary to find a way out of the problems by experimentally taking any means as long as there are even small possibilities. Otherwise, the world may return to nothing as in a case of massive floods occurring in ancient times.

According to the present disclosure, electron-collecting units are installed underground. Thus, electrons are supplied to all the substances from the electron-collecting units, and neutralization of oxidized substances and radioactive substances are promoted.

The world population has been steeply increased from 2.5 billion in 1950 through 7.5 billion in 2017. Along with the world population increase, it is estimated that there may be a huge amount of oxides on the ground surface.

Industrial waste disposal sites represented by a site of "Love canal incident" occurring in USA in the past greatly influence animals and plants. Such industrial waste disposal sites influence also humans, to cause, for example, dead births, deformed children, and so forth.

Furthermore, a huge amount of oxides results in abnormal weathers, and results in natural disasters. It is well known that, recently, lightning strikes, earthquakes, and so forth have been steeply increased.

Also for stably feeding food, neutralization of the ground surface is urgently needed.

For this purpose, electron-collecting units can be installed at fixed intervals in industrial waste areas, animal industry bases, contaminated sea areas, and radioactive substance contaminated areas, and then, variations in earthing resistance values can be measured.

At this time, a large amount of oxidation gas is generated during a neutralization process, and therefore, persons' entering the corresponding area is forbidden until the earthing resistance values at the locations where the electron-collecting units have been installed become 10Ω or less except for a time when the measurement is performed. The final target is to reduce the ground surface so that the earning resistance will have a value that is limitedly close to zero Ω.

They say that radioactive substances discharge radioactivity when unstable atomic nucleuses collapse. Therefore, it has been considered that electrons have no relationship with changes in atomic nucleuses. However, they said that, in β-decay, neutrons discharge electrons and antielectron-neutrinos to become protons, or protons discharge positrons and electron-neutrinos to become neutrons.

Further, atomic nucleuses may capture orbit electrons, and protons may react to electrons, to produce neutrons and electron-neutrinos. Such a process is called capture. In other words, it is considered that electrons take part of changes in atomic nucleuses.

Further, in a radioactive substance decontamination process, a surface soil is removed, the removed soil is bagged, and then, the bagged soil is moved, in the existing circumstances. There have not been technology for neutralizing a radioactive substance, and therefore, only a method has been to bury the radioactive substance for a long term underground.

In this regard, according to the present disclosure, as mentioned above, there may be a possibility that technology of burying electron-collecting units neutralizes a radioactive substance.

In the related art, huge cost is required to perform a radioactive substance decontamination process, and bags in which radioactive substances are stored may be decayed. Thus, no exit of the situation has been found in the related art.

Therefore, according to the present disclosure, it is considered that it may be necessary to install electron-collecting units in a radioactive substance contaminated area at fixed intervals, and observe a secular change of the contaminated state.

Next, patent references will now be described.

For example, Patent Reference No. 1 discloses "a carbon backfilling and storing method of backfilling with and storing carbides acquired from vegetable matters that mainly include charcoal in an underground empty space such as a coal mine site, a metal mine site, a mine site, a lock mine site, a tunnel site, a dugout site, or the like". In the document, it is explained that "a carbon dioxide gas in the atmosphere is reduced, also environmental conservation for avoiding a soil subsidence otherwise occurring due to artificial underground space reclamation, or the like, is performed, or backfilled carbon is used as a resource that may be able to be used for a far future".

However, Patent Reference No. 1 is silent for, as in the present disclosure, "a global environmental conservation electrostatic induction method including an electron-collecting process of gradually decreasing an earthing resistance value of buried carbon bodies to have a value of 10Ω or less".

Also, according to the technology of Patent Reference No. 1, it may be not possible that "at an abnormal state where an electric field has an electric potential difference amounting to hundreds of millions of volts at a time when a lightning strike would otherwise occur, electric lines of force are reliably prevented from being connected, to avoid or control occurrence of a lightning strike, and, if a movement (a seismic wave) of supplying electrons from an active fault occurs, electrons collected at the carbon bodies are discharged to a seismic wave, whereby an electron wave absorbs electrons so that the seismic wave can be reliably controlled" as in the present disclosure.

According to Patent Reference No. 1, carbon is used as a material to backfill an artificial excavated site. As will be described later, it is not possible to use carbon for backfilling with the use of a common compacting machine. In particular, from a safety viewpoint, it is not desired to use charcoal for backfilling a continuously excavated site.

Charcoal is used for backfilling through a water-binding process. However, if such a process is carried out continuously, a liquefaction phenomenon may occur, and thus, such a method is not desired from a safety viewpoint. Backfilling should be carried out with the use of soil and sand having the same weight per unit volume as that of the geology near the site. In comparison to the weight per unit volume of soil and sand (1.6 tf/m$^3$), the weight per unit volume of carbon (0.5 tf/m$^3$) is remarkably small.

Also, the present disclosure is different from such a process of Patent Reference No. 1 of merely backfilling for avoiding a soil subsidence, or the like.

Patent Reference No. 2 discloses that "a hole having a dimeter greater than or equal to 0.3 m and a depth in a range between 0.5 m and 2 m is formed, then, the hole is filled with a carbon component from a bottom for a height of greater than or equal to 50 cm, and for a weight of greater than or equal to 10 kg, and the buried carbon is soused with a solution of a zymogenous microorganism group including a lactic acid bacterium and a yeast fungus", and that "by adding the zymogenous microorganism group to the carbon component, it is possible to have a new advantageous effect of driving away mosquitoes in addition to an environment improvement effect even the carbon component has a smaller amount than the conventional art and the hole is smaller than the conventional art".

However, Patent Reference No. 2 is silent for, as in the present disclosure, "a global environmental conservation electrostatic induction method including an electron-collecting process of gradually decreasing an earthing resistance value of buried carbon bodies to have a value of 10Ω or less".

Also, according to the technology of Patent Reference No. 2, it may be not possible that "at an abnormal state where an electric field has an electric potential difference amounting to hundreds of millions of volts at a time when a lightning strike would otherwise occur, electric lines of force are reliably prevented from being connected, to avoid or control occurrence of a lightning strike, and, if a movement (a seismic wave) of supplying electrons from an active fault occurs, electrons collected at the carbon bodies are discharged to a seismic wave, whereby an electron wave absorbs electrons so that the seismic wave can be reliably controlled" as in the present disclosure.

Also, according to Patent Reference No. 2, a magnitude of a ratio of surface to volume of charcoal is effectively used. In contrast, according to the present disclosure, a feature of charcoal appearing when charcoal is used in an electron-collecting unit is used.

An advantageous effect of technology of Patent Reference No. 2 is due to a microbe group. However, microbes can lives, in the same way as humans, only when food is supplied. According to Patent Reference No. 2, a microbe group is supplemented periodically.

According to the present disclosure, nothing is required to do after installation of an electron-collecting unit.

In addition, concerning Patent Reference No. 2, it is considered that all of living bodies which a human calls harmful insects are necessarily present on the earth. Living bodies called harmful insects consume oxides on the earth to purify the earth. Such living bodies go away by themselves after having finished their jobs.

Patent Reference No. 3 discloses "a metal earth burying method and a carbon rod earth forming and burying method". In these methods, a metal earth and a carbon earth are buried deeply underground, extending ends of the earths are exposed to the ground surface and are connected to a cultivated soil or a building, and charcoal fine powder is diffused and mixed uniformly. Thus, a huge earth is acquired covering the entire area of the ground surface. This huge earth is used to collect earth currents, and the collected earth currents are discharged as negative electrons to the air. The huge earth reaches the ground water basin.

According to Patent Reference No. 3, "in order to solve health problems or vegetation problems that may otherwise occur due to a variation of the earth potential inside a site of a building or a limited cultivated soil such as a hothouse, both a metal earth and a carbon earth are buried. Thereby, a variation in the earth potential there is eliminated, and also, the inside of the earth buried area is made to have negative electrons. Thus, such a natural property that PH of living bodies including humans is made to become weak alkali is artificially produced".

However, Patent Reference No. 3 is silent for, as in the present disclosure, "a global environmental conservation electrostatic induction method including an electron-collecting process of gradually decreasing an earthing resistance value of buried carbon bodies to have a value of 10Ω or less".

Also, according to the technology of Patent Reference No. 3, it may be not possible that "at an abnormal state where an electric field has an electric potential difference amounting to hundreds of millions of volts at a time when a lightning strike would otherwise occur, electric lines of force are reliably prevented from being connected, to avoid or control occurrence of a lightning strike, and, if a movement (a seismic wave) of supplying electrons from an active fault occurs, electrons collected at the carbon bodies are discharged to a seismic wave; whereby an electron wave absorbs electrons so that the seismic wave can be reliably controlled" as in the present disclosure.

Also, the expression in Patent Reference No. 3 that the earth currents are collected is not understandable.

Also, concerning the present disclosure, as mentioned above, at a time when a lightning strike would otherwise occur, electrons on the ground surface go underground. Therefore, it seems necessary to capture electrons at an underground position. Thus, the technology of Patent Reference No. 3 is different from the present disclosure.

Also, the process of Patent Reference No. 3 that "charcoal fine powder is diffused and mixed uniformly on the ground surface" is different from the present disclosure.

Also, a required work amount in the process of Patent Reference No. 3 depends on a site area and a used amount of carbon. Also, Patent Reference No. 3 is silent for a required amount of carbon.

Patent Reference No. 4 discloses an "buried charcoal holding apparatus".

In the buried charcoal holding apparatus, a holding frame 10 is formed to have a cylindrical shape from an aluminum plate material. An insulation coating lead wire 20 is wound on an outer circumferential surface of the holding frame 10. One end 21 of the insulation coating lead wire 20 is exposed from a bottom end of the holding frame as a lower winding part 24. The other end is exposed from a top of the holding frame 10 as an upper winding part 25. The lower winding part 24 is wound like a coil toward to an upper direction of the holding frame 10 seven and half times.

Thereafter, the lower winding part 24 is introduced into an inner circumferential side of the holding frame 10 as a folded part 23, which is then again exposed to the outer circumferential side. An upper winding part 25 continuing from the folded part 23 is wound like a coil further toward the upper direction seven and half times in the direction opposite to the lower winding part 24. Insulating coating at each of the one end part 21 of the insulation coating lead wire 20, the folded part 23, and the other end part 22 is removed to acquire a conductive part.

According to Patent Reference No. 4, with the buried charcoal holding apparatus, "workability in a process of burying carbon is improved, also, it is possible to prevent, for a long term, an earth potential improving function due to burying carbon from being lost, and also, it is possible to further improve the earth potential improving function with respect to the same amount of carbon.

However, Patent Reference No. 4 is silent for, as in the present disclosure, "a global environmental conservation electrostatic induction method including an electron-collecting process of gradually decreasing an earthing resistance value of buried carbon bodies to have a value of 10Ω or less".

Also, according to the technology of Patent Reference No. 4, it may be not possible that "at an abnormal state where an electric field has an electric potential difference amounting to hundreds of millions of volts a time when a lightning strike would otherwise occur, electric lines of force are reliably prevented from being connected, to avoid or control occurrence of a lightning strike, and, if a movement (a seismic wave) of supplying electrons from an active fault occurs, electrons collected at the carbon bodies are discharged to a seismic wave, whereby an electron wave absorbs electrons so that the seismic wave can be reliably controlled" as in the present disclosure.

In addition, the present disclosure has a feature that it is possible to simply produce an advantageous effect. Charcoal can be maintained for thousands of years from a historical viewpoint, and effects thereof will be maintained semi-permanently. In other words, artifacts should be limited to a required minimum.

Also, Patent Reference No. 4 is silent for a difference in a numeral value acquired from a case of using an artifact. Also, Patent Reference No. 4 is silent for target numerical values, and therefore, the disclosure of Patent Reference No. 4 is clearly different from the present disclosure.

Patent Reference No. 5 discloses "a carbon installation device and an installation method thereof".

The carbon installation device has a cement-made cylindrical body including an iron wire as a core and having water permeability. The carbon installation device has a lid 12 at an opening at an upper end, and a connecting rib 14 around the opening. At a lower end of the cylindrical body, the carbon installation device has a bottom 16.

The inside of the cylindrical body is filled with carbonaceous 18 that is charcoal power or charcoal grains having high electrical conductivity. The connecting rib 14 is inserted into a bottom 26 of another cylindrical body 20 to form a plurality of the cylindrical bodies. Thus, it is possible to bury the carbon installation device underground or install the carbon installation device on the ground surface with the use amount of carbonaceous substance being increased several times.

According to Patent Reference No. 5, "because the water permeable cylindrical body having the bottom is filled with carbonaceous, it is possible to bury carbonaceous or install carbonaceous on the ground surface using the cylindrical body. Thus, according to Patent Reference No. 5, a process of filling carbonaceous that is performed at an installation site in the related art has been previously completed. Therefore, only a process of conveying the carbon installation device to the installation site, and a process of burying or installing the carbon installation device are needed. Thus, it is possible to reduce the cost by standardizing a carbon installation device, simplifying a carbonaceous filling work, and saving manpower in the installation site".

However, Patent Reference No. 5 is silent for, as in the present disclosure, "a global environmental conservation electrostatic induction method including an electron-collecting process of gradually decreasing an earthing resistance value of buried carbon bodies to have a value of 10Ω or less".

Also, according to the technology of Patent Reference No. 5, it may be not possible that "at an abnormal state where an electric field has an electric potential difference amounting to hundreds of millions of volts at a time when a lightning strike would otherwise occur, electric lines of force are reliably prevented from being connected, to avoid or control occurrence of a lightning strike, and, if a movement (a seismic wave) of supplying electrons from an active fault occurs, electrons collected at carbon bodies are discharged to a seismic wave, whereby an electron wave absorbs electrons so that the seismic wave can be reliably controlled" as in the present disclosure.

Also, concerning the present disclosure, as mentioned above, at a time when a lightning strike would otherwise occur, electrons on the ground surface go underground. Therefore, it seems necessary to capture electrons underground.

In this regard, the process of Patent Reference No. 5 that "carbonaceous is buried underground or installed on the ground surface" is different from the present disclosure.

In addition, Patent Reference No. 5 is silent for a required carbon amount.

The present disclosure has a feature that it is possible to simply produce an advantageous effect. Charcoal can be maintained for thousands of years from a historical viewpoint, and effects thereof will be maintained semi-permanently. In other words, artifacts should be limited to a required minimum.

In addition, Patent Reference No. 5 is silent for a difference in a numeral value acquired from using an artifact. In addition, Patent Reference No. 5 is silent for target numerical values, and therefore, the disclosure of Patent Reference No. 5 is clearly different from the present disclosure.

According to Patent Reference No. 6, "there are many contaminants (heavy hydrogen, heavy metal, radioactivity, other poisonous materials, and so forth) in water, soil, and air, and the contaminants badly affect humans, animals and plants. Especially, the contaminants badly affect agricultural products greatly. Therefore, there are many inventions for technology to improve processes of removing and purifying contaminants. However, they have advantages and disadvantages, and therefore, there may have been no decisive measure. Especially, what is a disadvantage and a problem is that advantageous effects do not last long".

In addition, according to Patent Reference No. 6, "it has been found out to effectively use energy of minerals in the natural world (mainly ores that contain mineral components). For this purpose, by installing a device that is a combination of a bottle that contains the mineral and a box having a hexagonal shape in a contaminated location, many contaminants are neutralized and are halved. In addition, the advantageous effects last sufficiently long. Thus, the device solves the conventional problems".

However, Patent Reference No. 6 is silent for, as in the present disclosure, "supplying electrons to used activated carbon with an electrostatic induction apparatus to neutralize or reduce impurities that have been absorbed by the used activated carbon, and using at least the neutralized or reduced used activated carbon".

In addition, Patent Reference No. 6 is silent for "installing electron-collecting units having a total volume greater than or equal to 5 $m^3$ with respect to a radiation-contaminated area 1000 $m^2$".

Therefore, a method of neutralizing radioactive substances according to Patent Reference No. 6 is different from the present disclosure. In addition, Patent Reference No. 6 is silent for principle of radioactive substance neutralization.

A problem to be solved by technology disclosed by Patent Reference No. 7 is to provide "a new method of decontaminating radiation-contaminated water with which, even in a case where radiation-contaminated water having a high salt concentration is processed, it is possible to efficiently remove radioactive cesium from the radiation-contaminated water. Also, it is possible to easily carry out a post process of a radioactive cesium absorbing process".

In this regard, Patent Reference No. 7 proposes "a radiation-contaminated water decontaminating method". The radiation-contaminated water decontaminating method includes, for solving the above-mentioned problem, step of causing a radioactive-cesium-contained radiation-contaminated water that contains radioactive cesium and has a salt concentration greater than or equal to 0.3 w/v % to come into contact with a radioactive substance absorbing material A containing a sparingly-soluble ferrocyan compound, to cause the radioactive substance absorbing material A to absorb the radioactive cesium; step of, after cleaning the radioactive substance absorbing material A that has absorbed the radioactive cesium in the previous step, to remove the dissolved salts, and causing the radioactive substance absorbing material A to come into contact with an acid water, to extract, in the acid water, the radioactive cesium absorbed by the radioactive substance absorbing material A; and step of causing the acid water into which the radioactive cesium has been extracted in the previous step to come into contact with a radioactive substance absorbing material B containing zeolite. Also, according to claim 6 of Patent Reference 7, "as the radioactive substance absorbing material A, . . . activated carbon . . . " is included.

However, Patent Reference No. 7 discloses a method relating to a post-process to be carried out after radioactive cesium is absorbed from a radiation-contaminated water, and having step of causing a radioactive substance absorbing material A containing activated carbon to absorb the radioactive cesium.

Thus, the technology disclosed by Patent Reference 7 is different the present disclosure of "supplying electrons to used activated carbon with an electrostatic induction apparatus, to neutralize or reduce impurities absorbed by activated carbon, and using at least the neutralized or reduced used activated carbon".

Also, the technology disclosed by Patent Reference 7 is different from the present disclosure of "adjusting, according to a property of an environmental conservation implementation area, an amount of activated carbon to be buried and the number of locations in each of which the activated carbon is buried, and gradually decreasing an earthing resistance value of the environmental conservation implementation area to cause the earthing resistance to have a value less than or equal to $10\Omega$".

Patent Reference No. 8 discloses "an apparatus to treat radiation-contaminated soil and sand with which, in a case of decontaminating slurry-like radiation-contaminated soil and sand, it is possible to reduce a volume and a weight of radiation-contaminated soil and sand by dehydrating it to be able to treat it as a solid body, it is possible to efficiently perform respective steps of loading it, transporting it, temporarily placing it, and finally disposing it, and it is possible to reduce a project cost".

According to the "apparatus to process radiation-contaminated soil and sand", after radiation-contaminated soil and sand are cleaned with a shredding and stirring machine or by supplying water, the thus cleaned soil and sand are classified with a classifier into gravel and sand having a low radioactive substance concentration and slurry having a high radioactive substance concentration. Then, after flocculant is added to the slurry, the slurry is dehydrated with a high-pressure filter press, and the radioactive substance is accumulated into a dehydrated cake. Thus, it is possible to reduce a volume and a weight of radiation-contaminated soil and sand.

According to Patent Reference No. 8, "because slurry-like radiation-contaminated soil and sand are dehydrated to be treated as a solid body, it is possible to efficiently perform respective steps of loading the radiation-contaminated soil and sand, transporting it, temporarily placing it, and finally disposing it, and it is possible to reduce a product cost". Also, according to paragraph [0023], "as a specific substance name of a cesium absorbing material, for example, . . . activated carbon . . . , or the like, can be cited".

However, the technology of Patent Reference No. 8 is different from the present disclosure of "supplying electrons to used activated carbon with an electrostatic induction apparatus, to neutralize or reduce impurities absorbed by activated carbon, and using at least the neutralized or reduced used activated carbon".

Also, the technology disclosed by Patent Reference 8 is different from the present disclosure of "adjusting, according to a property of an environmental conservation implementation area, an amount of activated carbon to be bury and the number of locations in each of which the activated carbon is buried, and gradually decreasing an earthing resistance value of the environmental conservation implementation area to cause the earthing resistance to have a value less than or equal to $10\Omega$".

An object of the present disclosure is to provide an electrostatic induction system for global environmental conservation with which, by burying carbon bodies acquired from neutralizing or reducing used activated carbon underground to reliably decrease an earthing resistance value into a value close to zero, it is possible to increase a very superior electrostatic induction effect. Thereby, it is possible to reduce global environment damages such as those caused by lightning strikes, earthquakes, earth slides, radioactive substance contamination, industrial waste contamination, air contamination, and so forth, and also, it is possible to acquire power generation output with the use of electrons from space collected at the carbon bodies.

According to a first aspect of the present disclosure, an electrostatic induction system for global environmental conservation includes used activated carbon in a form of electron-collecting units, to which electrons are supplied by an electrostatic induction apparatus so that impurities that have been absorbed by activated carbon are neutralized or reduced, and neutralized or reduced used activated carbon is acquired. The neutralized or reduced used activated carbon is buried in an environmental conservation implementation area in such a manner that an amount of the buried neutralized or reduced used activated carbon and a number of locations at which the neutralized or reduced used activated carbon are buried are adjusted depending on a property of the environmental conservation implementation area, and that the buried neutralized or reduced used activated carbon gradually decreases an earthing resistance of the environmental conservation implementation area so as to cause the earthing resistance to have a value less than or equal to $10\Omega$.

In the first aspect of the present disclosure, an environmental conservation measure is provided to prevent electric lines of force from being connected, and to adjust an air environment near the ground surface in the entirety of a site.

Different from a related art of simply burying carbon, the electron-collecting units supply electrons to a ground surface to reliably prevent electric lines of force from being connected between a thundercloud and the ground in an abnormal state where an electric field has an electric potential difference amounting to hundreds of millions of volts between the thundercloud and the ground at a time when a lightning strike would otherwise occur. Thus, it is possible to create an environment where the electric lines of force are prevented from being connected to earth rods and earth leads, and thereby, it is possible to reliably improve measures against a lightning strike.

In addition, in a case where a movement (a seismic wave) to supply electrons from an active fault occurs, it is possible to reliably cause the seismic wave to disappear or to control the seismic wave to be attenuated, as a result of electrons collected at the activated carbon being discharged to the seismic wave and the electrons being absorbed by the electron wave.

In addition, in a case where there is an object that generates a nasty smell near an electron-collecting unit, electrons are supplied to the smelly object. Thus, the nasty smell is neutralized or reduced, and as a result, the smell can be reliably decreased within a short time.

In addition, an electron-collecting unit supplies electrons also to a space in a building through earth rods and earth leads. As a result, the electrons are supplied to, and thus, neutralize or reduce a contaminated air; a tired, ill-conditioned, and considerably oxidized person, an animal, a food, and all objects in the building. As a result, a place at which an electron-collecting unit is installed enters an approximately odorless state.

Thus, an electron-collecting unit acts as a natural air purifier, and can stabilize even an abnormal state where a ground surface is sharply oxidized, by continuously supplying electrons to the ground surface.

In addition, according to the first aspect of the disclosure, by supplying electrons from an electrostatic induction apparatus to used activated carbon, it is possible to neutralize or reduce organic compounds or odor components that are oxides and have been absorbed by activated carbon, within a short time.

Thus, it is possible to eliminate an industrial waste disposal process that may require a considerable cost and to avoid an industrial waste disposal cost, for the used activated carbon. Thus, it is possible to greatly reduce cost by using the used activated carbon in the electrostatic induction system for global environmental conservation.

According to a second aspect of the present disclosure, each of the electron-collecting units is produced as a result of carbon powder of the activated carbon having an average grain diameter less than or equal to 2 mm being hardened through a water-binding process to have a volume greater than or equal to 2 $m^3$.

In the second aspect of the present disclosure, it is desirable that the grain diameter of carbon powder of the activated carbon is less than or equal to 2 mm. In addition, a careful hardening process where gaps between the grains are eliminated through a water-binding process will result in a satisfactory state of the electron-collecting unit.

Carbon cannot be compacted with the use of a compacting machine in the same way as sand. In this regard, it is possible to avoid a soil subsidence by hardening the carbon for the electron-collecting unit through a water-binding process.

In addition, by producing the electron-collecting unit having a volume of greater than or equal to 2 $m^3$, it is possible to reliably decrease an earthing resistance value of the environmental conservation implementation area into a value close to zero, to improve an electron collecting function of the electron-collecting unit.

According to a third aspect of the present disclosure, the used activated carbon is neutralized or reduced as a result of electrons being supplied by the electrostatic induction apparatus to the used activated carbon placed on an insulating device through an earth rod buried in the used activated carbon.

In the third aspect of the present disclosure, it is possible to decrease electrical resistivity of the activated carbon. Thus, it is possible to improve the electron-collecting function of the used activated carbon.

According to a fourth aspect of the present disclosure, the electrostatic induction system further includes at least one earth rod that is buried in each of the electron-collecting units; an earth lead having one end connected with the at least one earth rod and the other installed in a target facility; and a metal fence that surrounds the environmental conservation implementation area for irradiating electrons that have been collected at the electron-collecting units so as to reduce an atmosphere around the environmental conservation implementation area.

In the fourth aspect of the present disclosure, an earth rod is driven at each of locations where the activated carbon is buried, and respective earth leads drawn from the earth rods are collected and are installed in a building (i.e., the target facility) for earthing all the equipment in the building. As a result, at a time when a lightning strike would otherwise occur, electric lines of force are reliably prevented from being connected, and the electron-collecting units supply electrons to a ground surface. Thus, it is possible to produce an environment where the electric lines of force are not connected to the earth leads and the earth rods. Therefore, it is possible to reliably improve measures against a lightning strike.

In addition, by discharging electrons that have been collected at the electron-collecting units to be supplied to a seismic wave, it is possible that the electrons are absorbed by the electron wave, and the seismic wave reliably disappears or is reliably controlled to be attenuated.

In addition, electrons that have been collected at the electron-collecting units are irradiated over a wide area, to reduce the atmosphere in an area inside a metal fence, and to keep the inside of the metal fence as continuously having a reduced state. As a result, it is considered possible to protect important equipment, a person, and an animal in the area from an induced lightning strike.

According to a fifth aspect of the present disclosure, the electron-collecting units that include such an amount of the neutralized or reduced used activated carbon as to gradually decrease the earthing resistance to have a value less than or equal to 10Ω are installed in a radioactive material contaminated area at regular intervals in such a manner that respective radioactive material neutralizing ranges of the electron-collecting units are adjacent to or overlap with one another, for receiving electrons that have been underground due to electrostatic induction caused between a lower part of a cloud and a ground surface, to use the received electrons to neutralize unstable atomic nucleuses included in a radioactive material.

In the fifth aspect of the present disclosure, electrons that go underground due to electrostatic induction caused between a lower part of a cloud and a ground surface can be received by the electron-collecting units for neutralizing unstable atomic nucleuses present in a radioactive substance.

Thus, it is possible to perform overall decontamination (i.e., area maintenance) without performing individual decontamination. That is, by supplying electrons to positive holes from which electrons have been removed, it is possible to implement neutralization and implement stabilization.

According to a sixth aspect of the present disclosure, the electron-collecting units each having a volume in a range between 2 m$^3$ and 3 m$^3$ are installed at intervals each in a range between 10 m and 30 m in the radioactive material contaminated area in such a manner that the respective radioactive material neutralizing ranges of the electron-collecting units are adjacent to or overlap with one another, and that a total volume of electron-collecting units included in an area of 1000 m$^2$ of the radioactive material contaminated area being greater than or equal to 5 m$^3$.

In the sixth aspect of the present disclosure, the electron-collecting units each of which has a volume in a range between 2 m$^3$ and 3 m$^3$ are installed in the radioactive material contaminated area at an interval in a range between 10 m and 30 m (or in a range between 10 m and 50 m) in such a manner that the respective radioactive material neutralizing ranges of the electron-collecting units are adjacent to or overlap with one another. Thereby, the earthing resistance value can be easily decreased synergistically.

In addition, by thus installing the electron-collecting units in such a manner, it is possible that the electron-collecting units sufficiently receive electrons that have been underground due to electrostatic induction occurring between a lower part of a cloud and a ground surface. Thus, it is possible to use the electrons thus received by the electron-collecting units for rapidly neutralizing unstable atomic nucleuses present in radioactive substance of the radioactive material contaminated area.

In addition, by using the electron-collecting units each of which has a volume in a range between 2 m$^3$ and 3 m$^3$, it is possible to reliably decrease the earthing resistance value into a value close to zero and increase the electron collecting function with a minimum volume.

According to a seventh aspect of the present disclosure, the electrostatic induction system further includes a metal fence installed in the radioactive material contaminated area for irradiating electrons that have been collected at the buried neutralized or reduced used activated carbon so as to neutralize or reduce a gas generated from the radioactive material.

Concerning the seventh aspect of the present disclosure, the metal fence is used also for such a purpose that, until the earthing resistance value at a point at which each electron-collecting unit is installed in the radioactive material contaminated area becomes less than or equal to 10Ω, persons are forbidden to enter the radioactive material contaminated area.

In this regard, an oxide gas is generated when oxides around the installed electron-collecting unit are neutralized, and may adversely influence persons. Therefore, persons are desired not to approach there until a time when generation of the oxide gas has been reduced to a certain degree.

As a result of oxides being thus neutralized, an environment through which electricity can easily flow is created. As an index therefor, an earthing resistance value is used, to determine a time when generation of the oxide gas has been reduced to a certain degree.

In addition, according to the seventh aspect of the present disclosure, electrons once collected at the electron-collecting units are irradiated to a wider area, to neutralize and reduce a gas generated from a radioactive substance inside the metal fence.

According to an eighth aspect of the present disclosure, the electrostatic induction system generates electric power with the use of the electron-collecting units.

According to the eighth aspect of the present disclosure, in comparison to other types of power generation such as nuclear power generation, solar power generation, wind power generation, geothermal power generation, and hydraulic power generation, it is possible to provide a power generation system that does not require a wide installation area, is safe, and is environmentally thoughtful.

In addition, because the electrostatic induction system according to the present disclosure uses an underground space, the electrostatic induction system may be not easily influenced by a natural disaster. In addition, the electrostatic induction system according to the present disclosure can generate electric power also during rain or at night. Thus, power generation using the electrostatic induction system according to the present disclosure is not restricted by natural conditions such as daylight hours, whether a site is included in a district having strong winds, and so forth, as in other power generation systems.

In addition, because the electrostatic induction system according to the present disclosure uses an underground space, it is possible to leave a farm, for example, for being able to be cultivated, and it is possible to avoid decreasing, for example, a forest for installing a power generation system, whereas when a solar power generation system is installed at a faLm or a forest, it may be not possible to continue cultivation in the farm or it may be necessary to decrease the forest. Thus, according to the present disclosure, it is not necessary to disrupt a natural environment.

In addition, according to the present disclosure, although power generating devices (that will be described later) need to be replaced at the end of their lives, the electron-collecting units can be used semi-permanently.

According to a ninth aspect of the present disclosure, the electrostatic induction system further includes power generating devices configured to generate electric power, the power generating devices being installed between the electron-collecting units and soil that is generated when the electron-collecting units are buried, the soil being used to backfill spaces above the buried electron-collecting units.

Concerning the ninth aspect of the present disclosure, the reason for inserting the power generating device between the electron-collecting unit and the soil that has been generated when the electron-collecting unit has been installed and has been placed above the installed electron-collecting unit is as follows.

Basically, at a time when a thundercloud is generated, electrons on a ground surface go underground due to electrostatic induction occurring between a lower part of the thundercloud and the ground surface and are then collected at the electron-collecting unit. At the same time, positive holes from which electrons have been removed accumulate near the ground surface above the electron-collecting unit. Thus, an electric potential difference is created between the underground electron-collecting unit and the position near the ground surface above the electron-collecting unit.

In case of a solar power generation system, a solar panel is placed on a ground surface. However, according to the ninth aspect of the present disclosure, a solar panel is not needed. Other parts of a solar power generation system can be used for the ninth aspect of the present disclosure.

Thus, according to the ninth aspect of the present disclosure, the power generating device is installed underground, and therefore, the ground surface can be used for another purpose.

In addition, it is possible to use parts of a solar power generation system as mentioned above. Therefore, it is possible to use a currently operated existing solar power generation system also as a power generation system that uses the electrostatic induction system according to the ninth aspect of the present disclosure. There, the usable parts of the existing solar power generation system are used also as parts of the power generation system that uses the electrostatic induction system according to the ninth aspect of the present disclosure.

According to a tenth aspect of the present disclosure, each of the above-mentioned power generating devices has a first region made of p-type silicon; and a second region made of n-type silicon, the second region being below the first region.

In the tenth aspect, as the power generation device, a power generating device that is used for solar power generation can be used. However, a vertical installation arrangement of p-type silicon and n-type silicon is upside down in comparison to a case where the power generation device is used for solar power generation. That is, the arrangement is upside down in comparison to a power generating device used for solar power generation.

This is because, at a time when a thundercloud is generated, positive holes from which electrons have been removed accumulate near a ground surface, whereas electrons that have been underground due to electrostatic induction caused between a lower part of the thundercloud and the ground surface are received by the electron-collecting units Plasma from space, especially, plasma due to a solar wind from the sun, is pouring down at all times. Normally, space plasma accumulates in a geostationary orbit zone 36,000 km above the ground. After the geostationary orbit zone comes to enter an oversaturated state, the plasma moves to an ionized layer 50 through 500 km above the ground and influences weather phenomena.

In addition, a phenomenon that plasma was discharged from the geostationary orbit zone at a burst occurred. In the past, such a phenomenon seemed to promote a generation of a great earthquake.

In a case where plasma from the geostationary orbit zone violently waves, an ionized layer is influenced, and a sudden generation of cumulonimbus and a rain storm such as a squall result. Worldwide heavy rains and floods occurring in recent July through August 2017 are estimated as occurring due to drastic changes in solar plasma.

Thus, plasma pours down on the ground at all, times. According to the eighth through ninth aspects of the present disclosure, the plasma is captured to be used to generate electric power.

First Embodiment

Hereinafter, a first embodiment of the present invention will be described based on the drawings.

Figure 11:
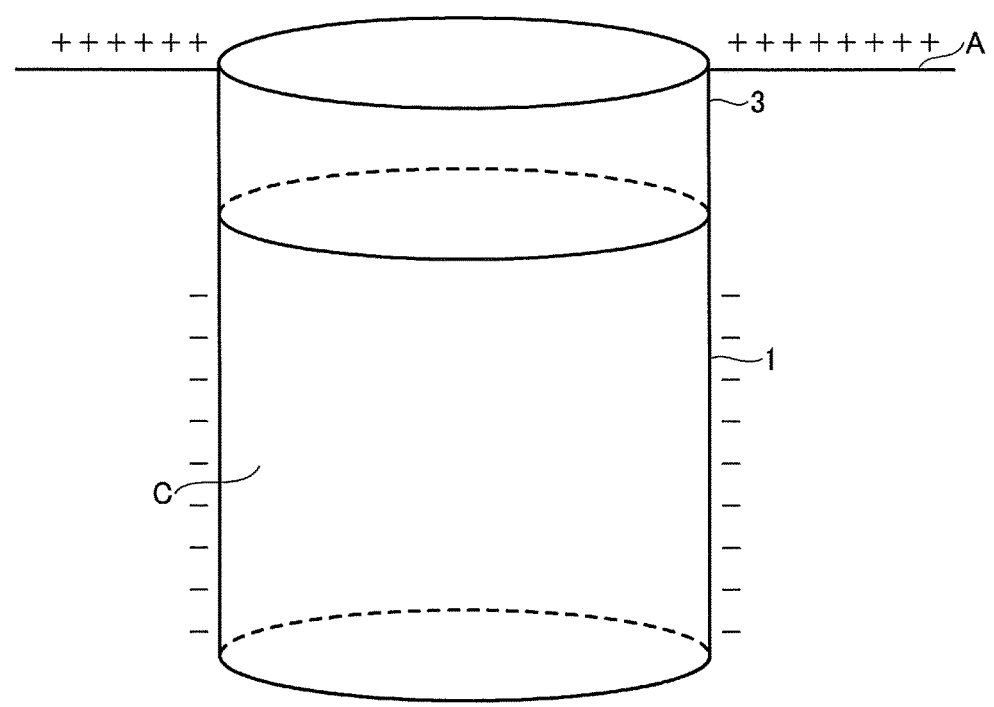
FIG. 11 illustrates an electron-collecting unit according to a first embodiment.

As illustrated in FIG. 11, according to the present embodiment, an electron-collecting unit 1 is installed as a result of carbon bodies (i.e., activated carbon) C being buried in an environmental conservation implementation area A originally having an earthing resistance of greater than or equal to 300Ω. Below, an electron collecting effect according to the present embodiment to decrease an earthing resistance value of a site with the use of the carbon bodies C to a value less than or equal to 10Ω will be described.

Assuming that a seismic wave is an electron wave, after a seismic wave reaches the electron-collecting unit 1 (i.e., the carbon bodies C), the electron wave absorbs electrons that have been discharged from the electron-collecting unit 1. Thus, the seismic wave should disappear or would be controlled.

This point is expected to be proved as a result of an earthquake meter being used to measure an earthquake in an area where the electron-collecting unit 1 is buried and installed. Therefore, it is assumed that, as a result of an electron wave absorbing electrons that have been discharged by the electron-collecting units 1, the seismic wave disappears or is controlled accordingly.

Also, the electron-collecting units 1 create an environment where electric lines of force that would otherwise be connected between a thundercloud and the ground at a time of a lightning strike in an abnormal state where an electric field has an electric potential difference amounting to hundreds of millions volts between the thundercloud and the ground are prevented from being connected.

In a normal state, the electron-collecting unit (carbon bodies) 1 receives and discharges electrons through earth rods and earth leads, as a living thing.

In a case where there are industrial wastes, an animal industry base, a contaminated sea area, or contaminants such as radioactive substances in an area where the electron-collecting units (carbon bodies) 1 are installed, the electron-collecting units 1 can supply electrons to the industrial wastes, the animal industry base, the contaminated sea area, or the contaminants such as radioactive substances, to neutralize or reduce oxides.

In a case where there is an object that generates a nasty smell near the electron-collecting unit 1, the electron-collecting unit 1 supplies electrons to the smelly object. Thus, the smelly object is neutralized or reduced so that the nasty smell decreases accordingly.

In addition, the electron-collecting unit 1 supplies electrons also to a space in a building through earth rods and earth leads. The electrons are supplied to, and thus neutralize or reduce a contaminated air, a tired, ill-conditioned, and considerably oxidized person, an animal, a food, and all objects in the building. As a result, a site where the electron-collecting units 1 are installed enters an approximately odorless state.

In other words, the electron-collecting unit 1 acts as a natural air purifier and can stabilize even an abnormal state where a ground surface is sharply oxidized, by continuously supplying electrons to the ground surface.

A conventional earthing system is such that after electric lines of force are connected between a thundercloud and the ground, a lightning current is caused to flow through the conventional earthing system for implementing protection from the lightning strike.

However, lightning strikes a point that is not necessarily a point having a conventional earthing system. Therefore, even if a conventional earthing system is installed, it may be difficult to sufficiently implement expected protection in a case where lightning strikes a place other than a place having a conventional earthing system.

The present embodiment is based on an opposite logic.

That is, according to the present embodiment, the entirety of a site near a ground surface is adjusted so that electric lines of force can be definitely prevented from being connected from the ground surface to a thundercloud. Thus, the present embodiment provides complete lightning protection measures.

As described above with reference to FIGS. 2A-4D, a movement (i.e., a wave) of electrons occurring in the atmosphere when a lightning strike occurs is a movement of supplying electrons. A movement of supplying electrons is transmitted upward until the movement reaches a lower part of a thundercloud, as described above with reference to FIGS. 4A-4D. Thus, electric lines of force are connected between the thundercloud and the ground, and therefore, a lightning strike occurs.

As measures against a lightning strike, it is estimated that, as a result of carbon bodies C of electron-collecting units 1 supplying electrons to the ground surface at a place where the electron-collecting units 1 are buried, a movement of electrons as illustrated in FIGS. 4B and 4C does not occur. Thus, it is estimated that electric lines of force can be prevented from being connected between the thundercloud and the ground, and therefore, a lightning strike can be avoided.

In addition, in a case where a movement (i.e., a seismic wave) for supplying electrons from an active fault occurs, it is estimated that, as a result of electrons that have been collected at electron-collecting units 1 being discharged therefrom and being supplied to the seismic wave, electrons is absorbed by the electron wave, and as a result, the seismic wave disappears or is controlled to be decreased.

In this regard, when an earthquake occurs, it is expected that a phenomenon that a seismic wave thus disappears or is decreased can be observed from an earthquake meter that is set near a place where an electron-collecting unit 1 is buried and installed.

In addition, positions at which electron-collecting units 1 will be buried and installed can be determined as follows.

That is, positions in a site at which a lavatory, a septic tank, a draining position, and so forth where bad smells are generated are considered.

In addition, places in the site such as a meeting place, a place for family members to enjoy each other's company in a house, and so forth where usually persons gather are considered.

Thus, various conditions of the site at which electron-collecting units 1 will be buried and installed are considered.

In addition, positions of important electric operating panel, telemeter panel, telemeter slave station, terminals, and so forth which are likely to receive lightning strikes are considered.

In consideration of these points, positions at which electron-collecting units 1 will be buried and installed can be determined.

At the same time, by burying and installing electron-collecting units 1 at a plurality of locations, an earthing resistance value of the site is reliably decreased into a value close to zero.

In addition, as a result of a long term being elapsed from when the electron-collecting units 1 are buried and installed, the earthing resistance value is further reliably decreased into a value further close to zero.

For example, an earthing resistance value is gradually decreased after 1 ton the electron-collecting unit 1 was buried and installed, as shown below.

335Ω (before an electron-collecting unit 1 is installed)
→26Ω (1 ton)
→14Ω (1 ton)
→6Ω (1 ton)
→4.7Ω (1 ton)

After approximately 9 years had elapsed from when the electron-collecting unit 1 was buried and installed, the earthing resistance had become less than or equal to 3Ω.

Figure 12:
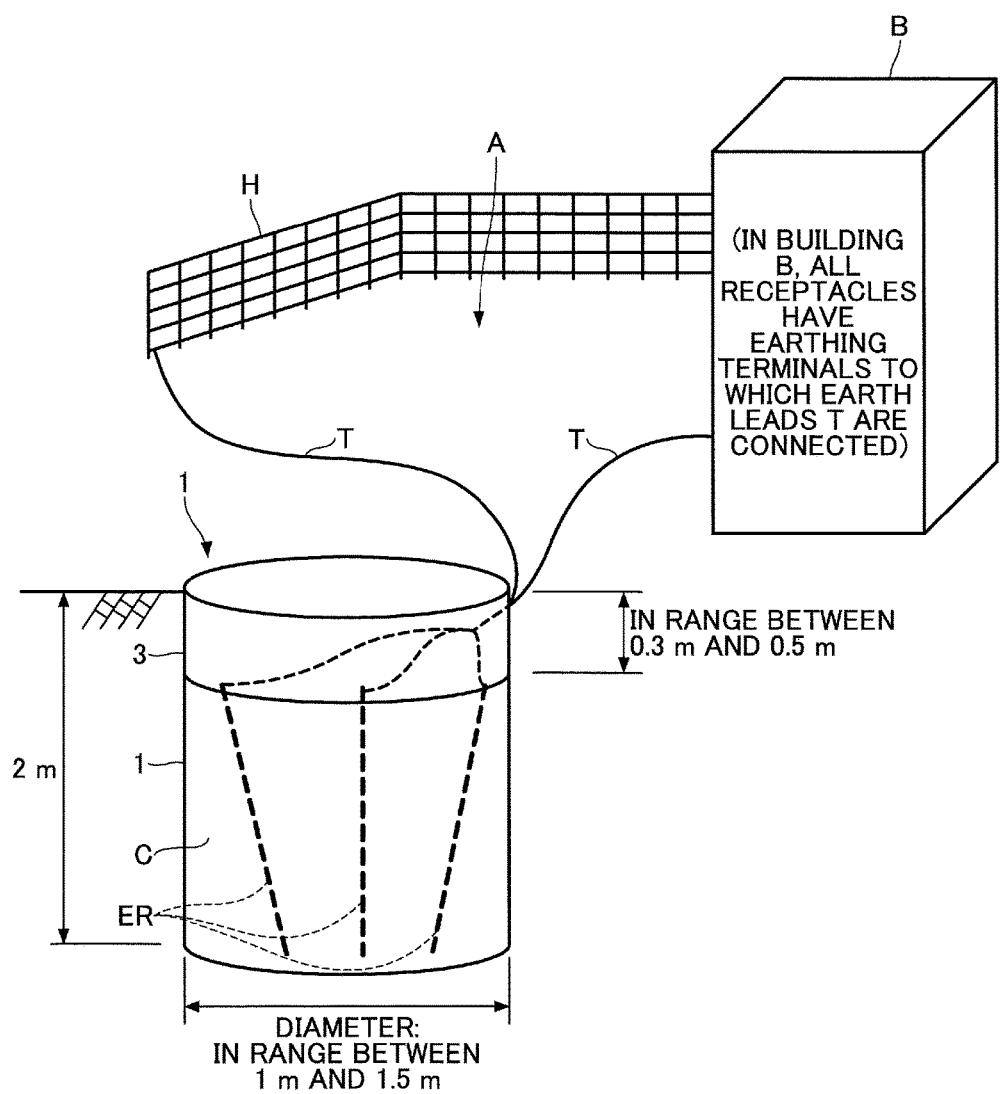
FIG. 12 illustrates a site where an electron-collecting unit is buried.

Note that the measurement of the earthing resistance was performed in such a condition as that illustrated in FIG. 12, for example, where earth rods ER are used as a measuring earthing electrode.

By increasing places where electron-collecting units 1 are buried and installed, the earthing resistance reliably falls.

Examples of earthing resistance reference values are shown below.

A-class: 10Ω
B-class: in a range between 5 Ω and 100Ω
C-class: 10Ω
D-class: 100Ω

From these reference values, a target of the earthing resistance value is desired as being less than or equal to 10Ω.

In future, the earthing resistance value will be reliably decreased into a value close to zero.

In this regard, it is difficult to prescribe electrical resistivity of an electron-collecting unit 1 in a particular specification. This is because conditions may vary depending on actually used materials, a carbonization temperature, and so forth. Therefore, it is difficult to uniformize electrical resistivity.

If electrical resistivity is prescribed, product shipment may be difficult, and an electron-collecting unit 1 may require a considerably high cost.

In this regard, the earthing resistance value can be checked at a site. Therefore, in order to decrease the earthing resistance, a method is to increase the number of locations at which electron-collecting units 1 are buried and installed.

Normally, electric resistivity of carbon to be used for producing an electron collecting unit 1 is determined from a carbonization temperature.

For example, Coconut husk activated carbon used in a water treatment process has a carbonization temperature in a range between 700° C. and 1000° C., and therefore, can be said to be carbon having good electrical resistivity.

Such carbon having good electrical resistivity can be desirably used as a material of an electron-collecting unit 1.

As the above-mentioned carbon bodies C of an electron-collecting unit 1, used activated carbon that has been used for removing a nasty smell during a water purifying process, can be used, for example.

Activated carbon used in water purifying or wastewater treatment is used as a nasty smell countermeasure. Therefore, the activated carbon has absorbed organic compounds or nasty smell components.

In the related art, at a time when activated carbon saturated with organic compounds or nasty smell components is disposed of, normally the activated carbon is treated as an industrial waste, and a considerable cost may be required.

In order to reuse such activated carbon that has absorbed organic compounds or nasty smell components and has saturated therewith, regeneration treatment is carried out where steaming is required, and thus, a considerable cost may be required.

Therefore, in the related art, used activated carbon is processed as industrial waste instead of regeneration treatment, and new activated carbon is purchased.

In a large-scale water purifying plant, industrial waste treatment may require a cost in a range between hundreds of millions of yens and thousands of millions of yens.

Therefore, according to the present embodiment, instead of treating used activated carbon as industrial waste, when an electron-collecting unit 1 is buried and installed, electrons are supplied to the used activated carbon with an electrostatic induction apparatus. Thereby, absorbed organic compounds or nasty smell components that are oxides are neutralized or reduced.

It is also possible to naturally neutralize or reduce oxide by simply burying carbon due to a nature of carbon. However, in this method, a long term may be required to neutralize or reduce oxides.

Therefore, according to the present embodiment, used activated carbon, which would be otherwise treated as industrial waste, are neutralized or reduced with an electrostatic induction apparatus, to use the neutralized or reduced used activated carbon as a material of an electron-collecting unit 1. Thus, it is possible to omit industrial waste treatment cost and, at the same time, to remarkably reduce cost of activated carbon to be used as a material of the electron-collecting unit 1.

Carbon bodies C as an electron-collecting unit 1 according to the present embodiment are desired to have a grain diameter less than or equal to 2 mm. A satisfactory state can result from careful backfilling with carbon bodies C in such a manner as to eliminate gaps between the grains through a water-binding process or the like.

The process of thus hardening carbon bodies C through a water-binding process will now be described in detail.

For example, in a case where a water supply pipe or the like is buried, backfilling is performed in such a manner that compaction is performed every 20 cm depth.

A water-binding process is performed also when backfilling with sand is performed for protecting the water supply pipe. This is because, in the same manner as carbon, it is not possible to implement compaction of sand with the use of a normal compacting machine.

In a case of road pavement, a density test or the like is performed.

For backfilling a dug hole for installing the water supply pipe or the like having a hole width on the order of 1 m, natural compaction is used with a wheel load applied by a vehicle or the like.

For installing an electron-collecting unit 1 according to the present embodiment, a density test or the like in a strict manner is not performed.

In a case of installing an electron-collecting unit 1 near a house or the like where foundation piles have been installed, the positions at which the foundation piles have been installed are avoided from being used to bury the electron-collecting unit 1.

In addition, above buried carbon bodies C of an electron-collecting unit 1, soil 3 that has been generated when the electron-collecting unit 1 was buried is used to backfill the space (see FIG. 11). Thereafter, a compacting machine or the like is used to sufficiently compact the soil 3. Thus, it is possible to avoid a soil subsidence.

In addition, in a case of installing an electron-collecting unit 1 in a cultivated land or the like, a surface soil above the electron-collecting unit 1 needs to have a sufficient thickness greater than or equal to approximately 30 cm such that the carbon bodies C are prevented from being reached even when a surface soil is removed for cultivation.

In a case of installing an electron-collecting unit 1 in a farm where a tractor is used for cultivation, a surface soil above the electron-collecting unit 1 needs to have a thickness on the order of 50 cm. However, digging for a depth greater than or equal to 2 m requires timber sheet piles, steel sheet piles or the like, and thus, high construction cost may be needed. Normally, in order to reduce construction cost, carbon bodies C are contained in a room having a height from 200 cm depth through 30 or 50 cm depth, as illustrated in FIG. 12.

However, in a case of installing an electron-collecting unit 1 for a large-scale building within a limited area, for example, a "Tokyo Sky Tree", sheet piles may be needed to use to dig deeply to bury a large amount of carbon bodies C for an electron-collecting unit.

Also, the hardened carbon bodies C of the electron-collecting unit 1 are desired to have a volume greater than or equal to 2 m$^3$ (i.e., 1 ton). With this volume, the electron collecting function of the electron-collecting unit 1 can be sufficiently performed.

How much an earthing resistance value of an electron-collecting unit 1 decreases in response to an increase in a volume of carbon bodies C greatly depends on an environment where the carbon bodies C are buried.

In this regard, as one example, actual results of measuring an earthing resistance value in the headquarters of the Applicant (DAIKYO CORPORATION) after 10 days from when carbon bodies C were buried are shown below.

The earthing resistance value at a place decreases as the volume of carbon bodies C buried in the place is increased, as follows.

335Ω (before burying carbon bodies C)

→26Ω, i.e., a decrease in 92.2% (with 1 ton of carbon bodies C)

→14Ω, i.e., a decrease in 95.8% (with total 2 tons of carbon bodies C)

→6Ω, i.e., a decrease in 98.2% (with total 3 tons of carbon bodies C)

→4.7Ω, i.e., a decrease in 99.6% (with total 4 tons of carbon bodies C)

In this regard, for example, as can be seen from a structure of a common manganese battery, carbon bodies C themselves have a property of collecting electrons, and therefore, conventionally, a performance of such an electron-collecting unit is expressed with a ground potential (mV) mentioned in a past reference. There, a result of measuring a weak electric potential of the ground is mentioned. However, at the present day, various electromagnetic waves are generated 24 hours, and therefore, it may be difficult to accurately measure such a ground potential.

Electrical resistivity of soft charcoal is in a range between $10^6$Ω·cm and $10^9$Ω·cm, whereas electrical resistivity of hard charcoal is in a range between $10^1$Ω·cm and $10^{-1}$Ω·cm. In other words, an effect as an electron-collecting unit may differ between soft charcoal and hard charcoal by approximately one million times. However, hard charcoal such as Binchotan charcoal is not suitable for carbon bodies C of an electron-collecting unit 1 according to the present embodiment from a quantitative securement viewpoint and from a cost viewpoint.

It can be said that the higher a carbonization temperature of carbon is, the smaller electrical resistivity of the carbon is, and therefore, the more suitable the carbon is to be used as carbon bodies C of an electron-collecting unit 1 according to the present embodiment.

It is possible to select carbon having a higher carbonization temperature and having a reasonable price to be used as carbon bodies C of an electron-collecting unit 1 according to the present embodiment.

In addition, as illustrated in FIG. 12, earth rods ER are driven into buried carbon bodies C, and earth leads T drawn from the earth rods ER are installed in a target building B (i.e., a target facility).

As illustrated in FIG. 12, the earth rods ER are driven at each place where carbon bodies C have been buried. The earth leads T drawn from the earth rods ER driven into the respective places in each of which the carbon bodies C have been buried are collected, and the collected earth leads T are connected to the building B for earthing the building B.

In this regard, in the building B, all receptacles have earthing terminals to which the earth leads T are connected.

As a result, at a time when a lightning strike would otherwise occur, and the carbon bodies C of the electron-collecting units 1 supply electrons to a ground surface, and electric lines of force are reliably prevented from being connected between the ground surface and a thundercloud.

Thus, it is possible to create an environment where electric lines of force are prevented from being connected to the earth leads and the earth rods, and it is possible to reliably improve a lightning protection measures.

In addition, electrons once collected at the carbon bodies C of the electron-collecting units 1 are discharged from the carbon bodies C to a seismic wave. The electron wave thus absorbs the electrons, and as a result, the seismic wave reliably disappears or is controlled to be attenuated.

In addition, according to the present embodiment, as illustrated in FIG. 12, a metal fence H is installed for irradiating, to a wider area, electrons once collected at the electron-collecting unit 1 that is installed underground, to reduce the atmosphere. Thereby, electrons once collected at the electron-collecting unit 1 are irradiated to a wider area, and the atmosphere in the area of the metal fence H is reduced. Thus, within the metal fence H, the atmosphere has a state of being continuously reduced. As a result, important apparatuses, persons, and animals are protected from induced lightning strikes.

Figure 13:
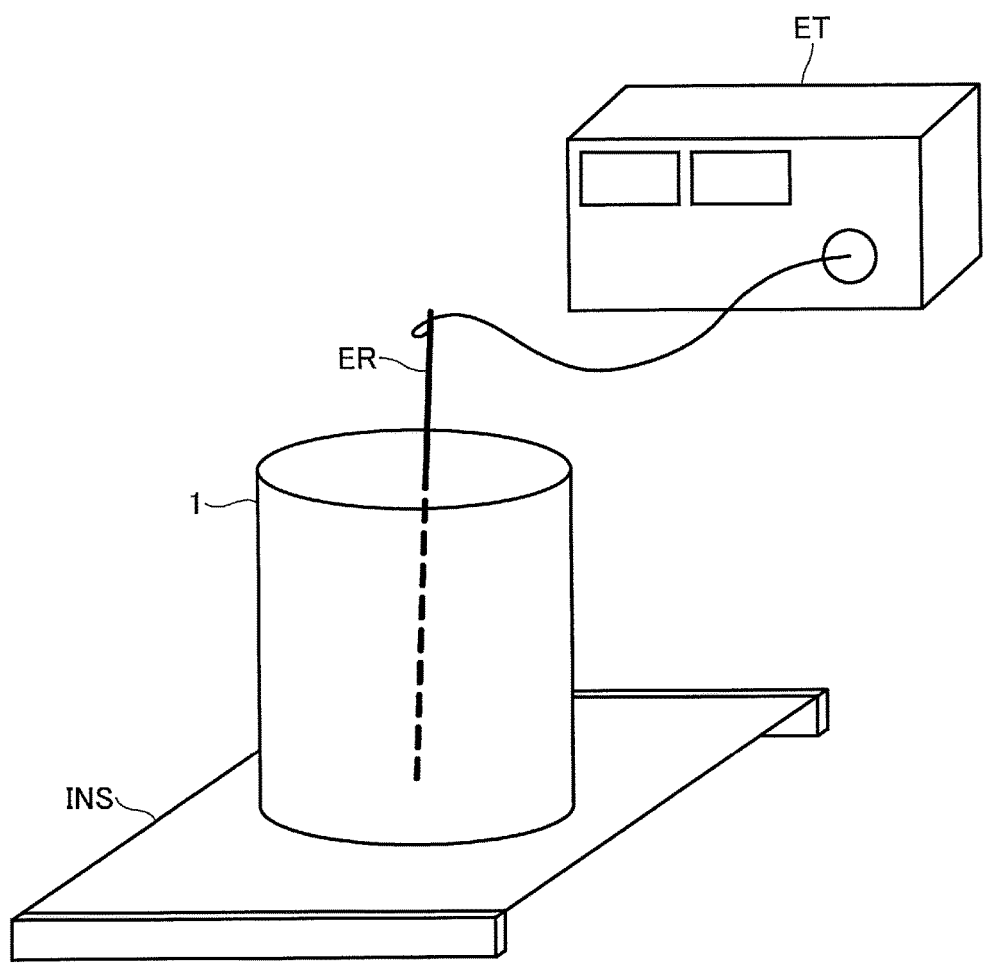
FIG. 13 illustrates a method of neutralizing used activated carbon with the use of an electrostatic induction apparatus.

In addition, as illustrated in FIG. 13, the electron-collecting unit 1 is placed on an insulating device INS. Then, an electrostatic induction apparatus ET supplies electrons to used activated carbon (i.e., carbon bodies C) of the electron-collecting unit 1 via an earth rod ER. Thus, organic substances and so forth (i.e., impurities) that have adhered to the used active carbon are neutralized or reduced before the electron-collecting unit 1 is buried underground.

As the electrostatic induction apparatus ET, it is possible to use a "transformer for generating a high alternating-current (AC) voltage" disclosed by Japanese Patent No. 3277015 (Japanese Laid-Open Patent Application No. H07-68269), for example.

In this regard, an example of how to actually use the "transformer for generating a high AC voltage" disclosed by Japanese Patent No. 3277015 as the electrostatic induction apparatus ET illustrated in FIG. 13 of the present application to neutralize or reduce organic substances and so forth adhered to used active carbon of the electron-collecting unit 1 will now be described.

That is, for neutralizing or reducing organic substances and so forth adhered to used active carbon of the electron-collecting unit 1, a "method for removing organic substances in liquid where the organic substances in the liquid are decomposed through dielectric polarization or electronic polarization occurring due to an electrostatic induction effect caused with the transformer for generating a high AC voltage" illustrated in FIG. 1 of Japanese Patent No. 3277015 can be used.

At this time, in a system diagram illustrated in FIG. 1 of Japanese Patent No. 3277015, the earth rod ER illustrated in FIG. 13 of the present application is used as a "stainless electrode 7" illustrated in FIG. 1 of Japanese Patent No. 3277015; the insulating device INS illustrated in FIG. 13 of the present application is used as an insulator 8 illustrated in FIG. 1 of Japanese Patent No. 3277015; and the earth rod ER is connected to one end 5b of a second winding of the transformer for generating a high AC voltage as illustrated in FIG. 1 of Japanese Patent No. 3277015.

Then, through the earth rod ER driven into the electron-collecting unit 1 as illustrated in FIG. 13 of the present application thus connected to the one end 5b of the second winding the transformer for generating a high AC voltage illustrated in FIG. 1 of Japanese Patent No. 3277015 used as the electrostatic induction apparatus ET, a predetermined voltage is applied by the transformer for generating a high AC voltage to and thereby a predetermined in current is caused to flow through the electron-collecting unit 1. As a result, an AC electric field is generated in the electron-collecting unit 1, and, through dielectric polarization or electronic polarization occurring due to an electrostatic induction effect caused by the generated electric field, neutralization or reduction of organic substances and so forth adhered to used active carbon of the electron-collecting unit 1 can be implemented.

Figure 14:
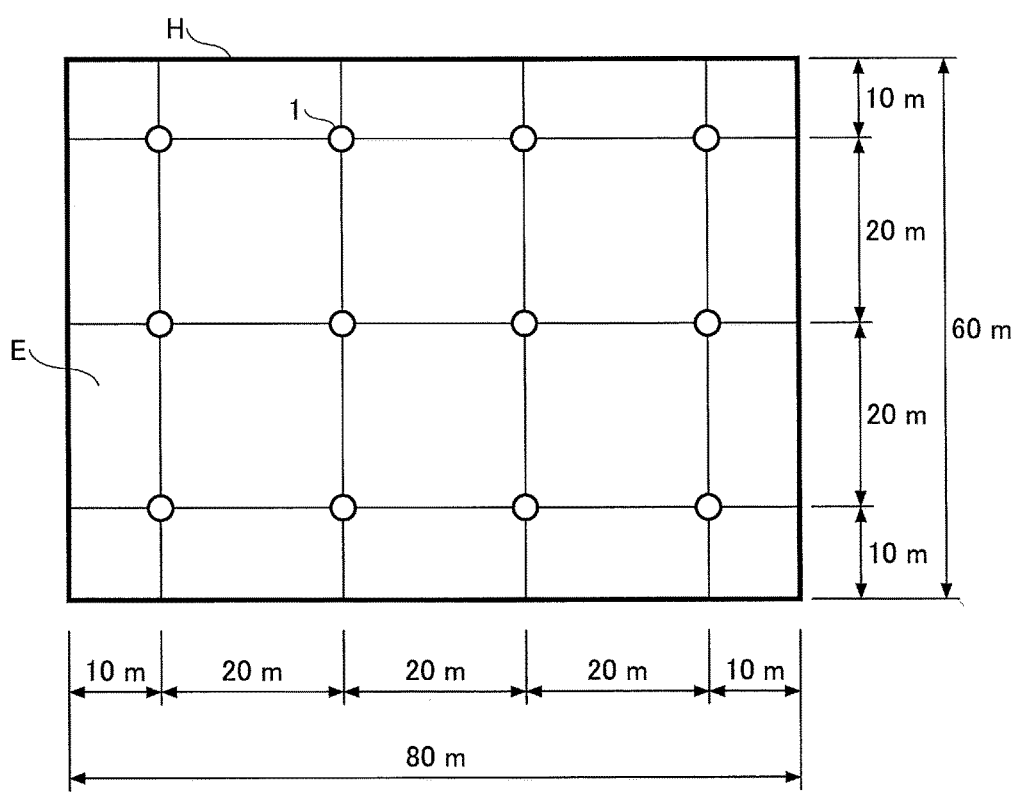
FIG. 14 illustrates an example where electron-collecting units are buried in a contaminated area.
Figure 15:
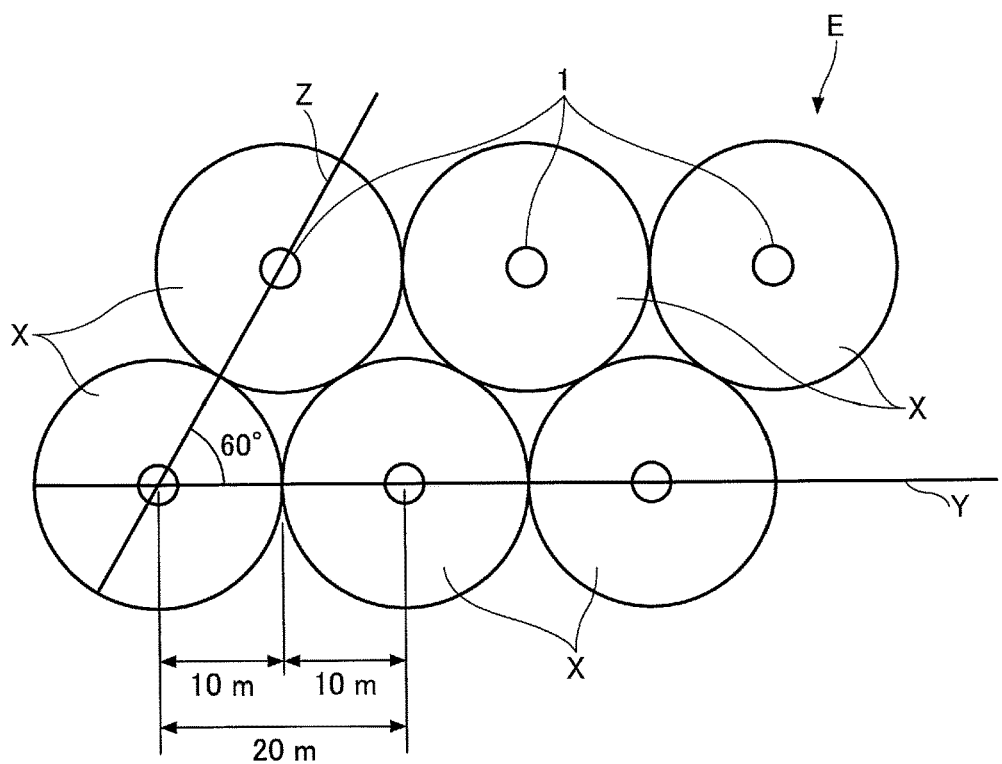
FIG. 15 illustrates another example where electron-collecting units are buried in a contaminated area.
Figure 16:
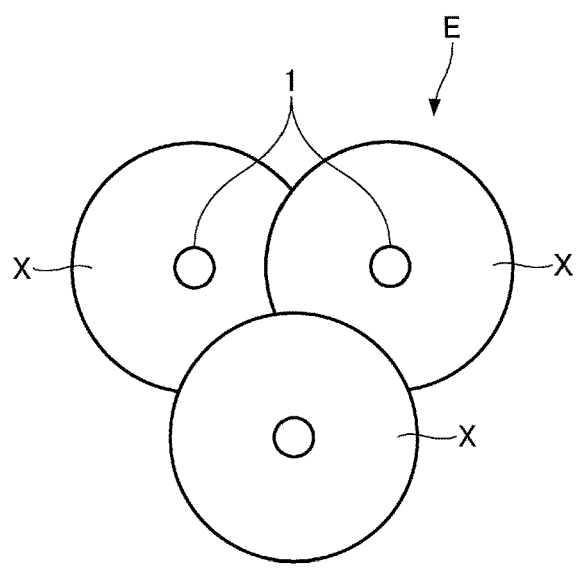
FIG. 16 illustrates yet another example where electron-collecting units are buried in a contaminated area.

FIGS. 14-16 illustrate examples in each of which electron-collecting units 1 according to the present embodiment are buried in a radioactive substance contaminated area.

FIG. 14 illustrates one example where, in a radioactive substance contaminated area E, the electron-collecting units 1 are buried at regular intervals. Each of the electron-collecting units 1 has a cylindrical shape having a diameter of 1200 mm and a height of 2000 mm including the height of the backfilled soil 3, for example.

FIG. 15 illustrates an example where first electron-collecting units 1 are arranged along a straightly arranging line Y. Second electron-collecting units 1 are arranged adjacent to and on one side of the first electron-collecting units 1 in such a manner that the second electron-collecting units 1 are along respective lines Z that extend from the first electron-collecting units 1 and have 60° with respect to the straightly arranging line Y.

Also, the first and second electron-collecting units 1 are arranged in such a manner that, as illustrated in FIG. 15, circles X each of which has a radius of 10 m and has a center at an electron-collecting unit 1 are in contact with each other. The circles X denote radioactive substance neutralizing ranges of the respective electron-collecting units 1.

FIG. 16 illustrates an example where, in a radioactive substance contaminated area E, the electron-collecting units 1 are buried in such a manner that their respective radioactive substance neutralizing ranges X overlap with each other.

That is, in the case of FIG. 16, spaces between the respective radioactive substance neutralizing ranges X of the electron-collecting units 1 are narrower than the case of FIG. 15. There, each of the radioactive substance neutralizing ranges X has a radius in a range between 10 m and 15 m about a center positioned at the corresponding electron-collecting unit 1. Thus, the respective radioactive substance neutralizing ranges X of the electron-collecting units 1 are arranged more densely in the case of FIG. 16.

Thus, according to the present embodiment, the electron-collecting units 1 each having the carbon bodies C with which an earthing resistance value of a contaminated area gradually decreases to 10Ω or less are buried in the contaminated area at regular intervals in such a manner that their respective radioactive substance neutralizing ranges X are adjacent to each other or overlap with each other.

Then, the electron-collecting units 1 receive electrons that have been underground due to electrostatic induction occurring between a lower part of a cloud and the ground. The electrons received by the electron-collecting units 1 are used to neutralize unstable atomic nucleuses present in radioactive substances.

In addition, persons' entering a point at which the electron-collecting unit 1 is installed is prohibited until an earthing resistance value at the point becomes less than or equal to 10Ω.

In addition, a metal fence H is installed in the radioactive substance contaminated area, and electrons collected at the carbon bodies C of the electron-collecting unit 1 are irradiated from the metal fence H to a wider area. Thus, gases from the radioactive substances in the area inside the metal fence H are neutralized or reduced by the irradiated electrons.

As illustrated in FIGS. 14-16, the carbon bodies C of the electron-collecting units 1 (each $\phi$ 1200 mm×h 2000 mm) are buried in such a manner that, for an area 1000 m$^2$ of the radioactive substance contaminated area E, a total volume of the electron-collecting units 1 amounts to 5 m$^3$ or more. A volume of carbon bodies C of each electron-collecting unit 1 is in a range between 2 m$^3$ and 3 m$^3$.

Each of the electron-collecting units 1 has its radioactive substance neutralizing range X having a diameter in a range between 10 m and 15 m. The electron-collecting units 1 are arranged in the radioactive substance contaminated area E at an interval in a range between 10 m and 30 m (as illustrated in FIG. 14) or with their respective radioactive substance neutralizing ranges X adjacent to each other (as illustrated in FIG. 15) or with their respective radioactive substance neutralizing ranges X overlapping with each other (as illustrated in FIG. 16).

If a total volume of the carbon bodies C of the electron-collecting units 1 for the area 1000 m$^2$ of the radioactive substance contaminated area E is less than 5 m$^3$, a time required for neutralizing the radioactive substance contaminated area E may be too long.

If each electron-collecting unit 1 having a volume in a range between 2 m$^3$ and 3 m$^3$ is arranged in the radioactive substance contaminated area E at an interval less than 10 m, an amount of carbon to be buried may be too much so that too much expense may be required.

If each electron-collecting unit 1 having a volume in a range between 2 m$^3$ and 3 m$^3$ is arranged in the radioactive substance contaminated area E at an interval greater than 30 m, too much time may be required to neutralize the radioactive substance contaminated area E.

Thus, a radioactive substance decays with time, and finally becomes a stable isotope not having radioactivity. As an index that indicates the time, a value called a half period is used.

A radioactive substance cesium 137 known concerning the Fukushima atomic power plant accident is a radioactive isotope of cesium, has a nuclear number 137, and is generated due to atomic fission of uranium 235 or the like.

Cesium 137 has a half period of 30.1 years, and becomes a metastable isotope of barium 137, i.e., barium 137m, due to $\beta$ decay.

A radioactive substance discharges radioactivity when unstable atomic nucleuses decay. In $\beta$ decay, a neutron discharges an electron and an antielectron-neutrino, to become a proton, or a proton discharges a positron and an electron-neutrino, to become a neutron.

In addition, an atomic nucleus may capture an orbital electron, and a proton may react with the electron, to produce a neutron and an electron-neutrino. Such a process is called electron capture. In other words, due to an influence of an electron, an atomic nucleus changes.

Electron capture is likely to occur in an atomic nucleus that has excessive protons and is unstable, and conflicts with $\beta$+ decay (positron decay) in many cases. In this regard, only electron capture occurs for a case where an energy gap between a parent nucleus and a daughter nucleus is less than 1.022 MeV.

To a hole created in an orbit, an electron transitions from an outer electron orbit, and an X-ray (characteristic X-ray) having a wavelength corresponding to an energy gap between the orbits is discharged.

$\beta$+ decay occurs only when an energy gap between a parent nucleus and a daughter nucleus is greater than or equal to a static energy of an electron and a positron.

However, in the past, there were many cases of decay even where this relationship is not satisfied.

In 1935, Hideki Yukawa proposed another process where an atomic nucleus captures an orbital electron, and, in 1937, Luis Alvarez experimentally proved capture of a K-orbital electron.

Cesium 137 $\beta$-decays into barium 137m, and therefore, is a strong source of a gamma ray. Cesium 137, the same as strontium 90, becomes a major medium-lived nuclear fission product.

These materials lead to radioactivity in used atomic fuels, and, need cooling for a term in a range between several years and hundreds of years at the longest after being used. For example, currently, cesium 137 and strontium 90 account for most of sources of radioactivity generated in a region around the Chernobyl nuclear power plant accident scene.

Generally speaking, cesium 137 has a low neutron capture rate, and, therefore, it is not possible to treat cesium 137 with the use of neutron capture. Thus, it is necessary to wait for natural decay of cesium 137.

In this regard, according to the present embodiment, electron-collecting units 1 receive electrons that have been underground due to electrostatic induction occurring between a lower part of a cloud and the ground in a worsening weather.

Then, it is expected that unstable atomic nucleuses, i.e., positive holes, present in a radioactive exposure area, capture the electrons that have been once received by the electron-collecting units 1 as mentioned above. As a result, it is expected that the unstable atomic nucleuses are neutralized by the electrons. Thus, there is a possibility that electron capture raises a neutron capture rate.

Before an earthing resistance value of a site becomes less than or equal to 10Ω due to electron-collecting units 1 that have been buried in the site, it is estimated that the electron-collecting units 1 are discharging an oxide gas on the ground surface and to the atmosphere.

In this state, it is estimated that electrons that electron-collecting units 1 capture are immediately consumed to neutralize positive holes. Therefore, during the state, the site may easily suffer a natural disaster. However, looking toward the future, it is desired to steadily neutralize oxides that humans have produced until now, even in consideration of such a risk.

After the earthing resistance value of the site has approached 0Ω, the electron-collecting units 1 enter a state of stably capturing electrons, and the ground surface enters a reduced state from a neutralized state.

A major problem concerning an industrial waste, an animal industry base, and a contaminated sea area comes from oxides. Therefore, after the earthing resistance value of the site has thus approached 0Ω, multipurpose land utilization is highly probable.

That is, the site where the electron-collecting units 1 have been buried comes to have an environment where the reduced state advantageous for growing of animals and plants can be maintained.

In a case where the site where the electron-collecting units 1 have been buried is a radioactive substance contaminated area, it is desired to periodically and continuously perform radioactivity measurement. Upon planning land utilization in such a case, it is desired to highly consider safety under the direction of a professional.

Second Embodiment

Next, a second embodiment of the present invention will be now described.

Figure 17:
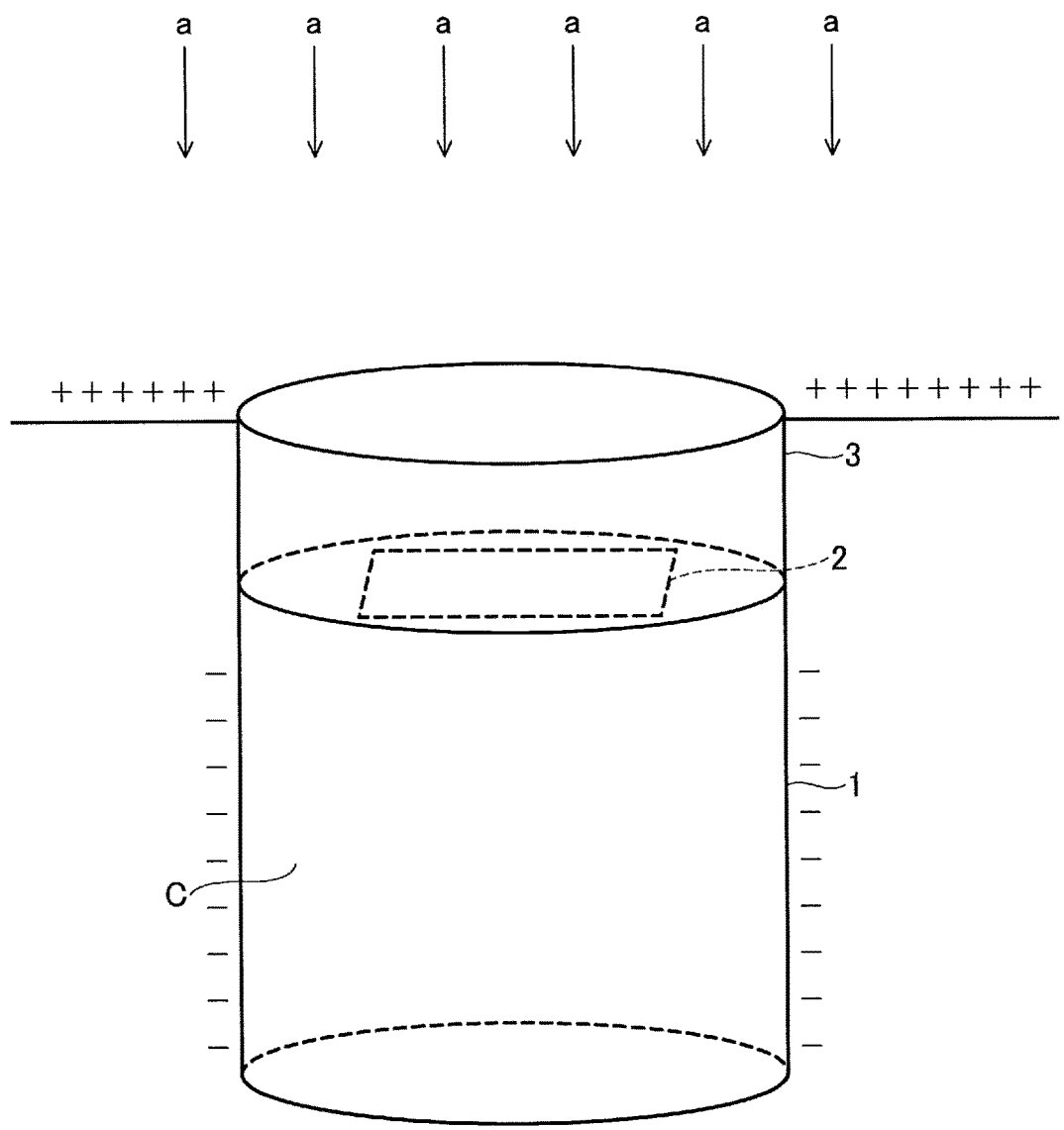
FIG. 17 illustrates a space plasma power generation arrangement according to a second embodiment where a power generating device is installed at an electron-collecting unit.
Figure 18:
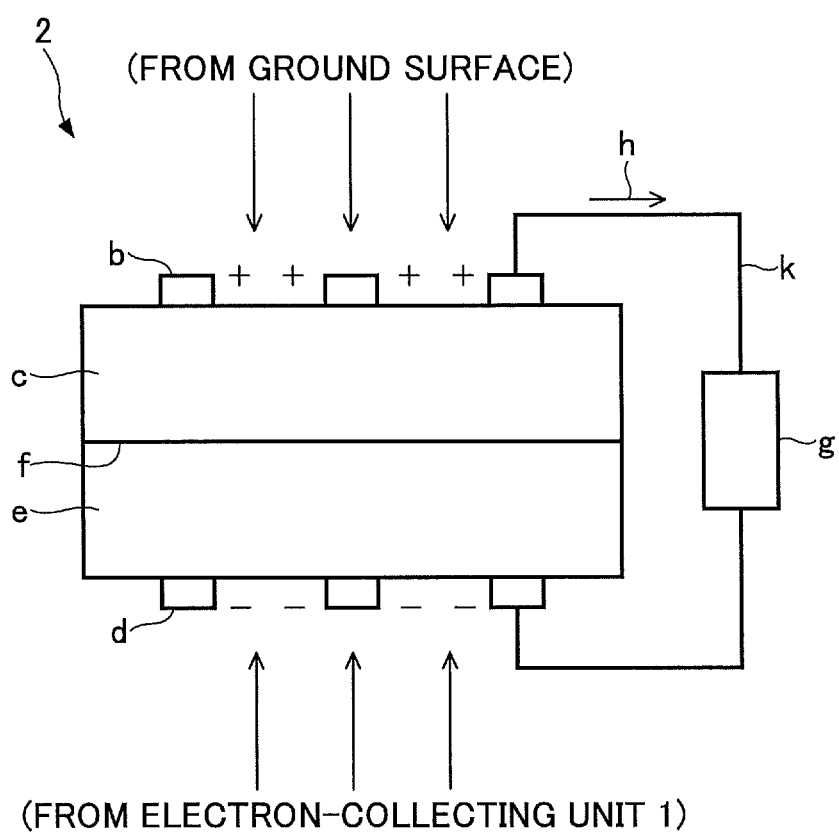
FIG. 18 illustrates the power generating device.
Figure 19:
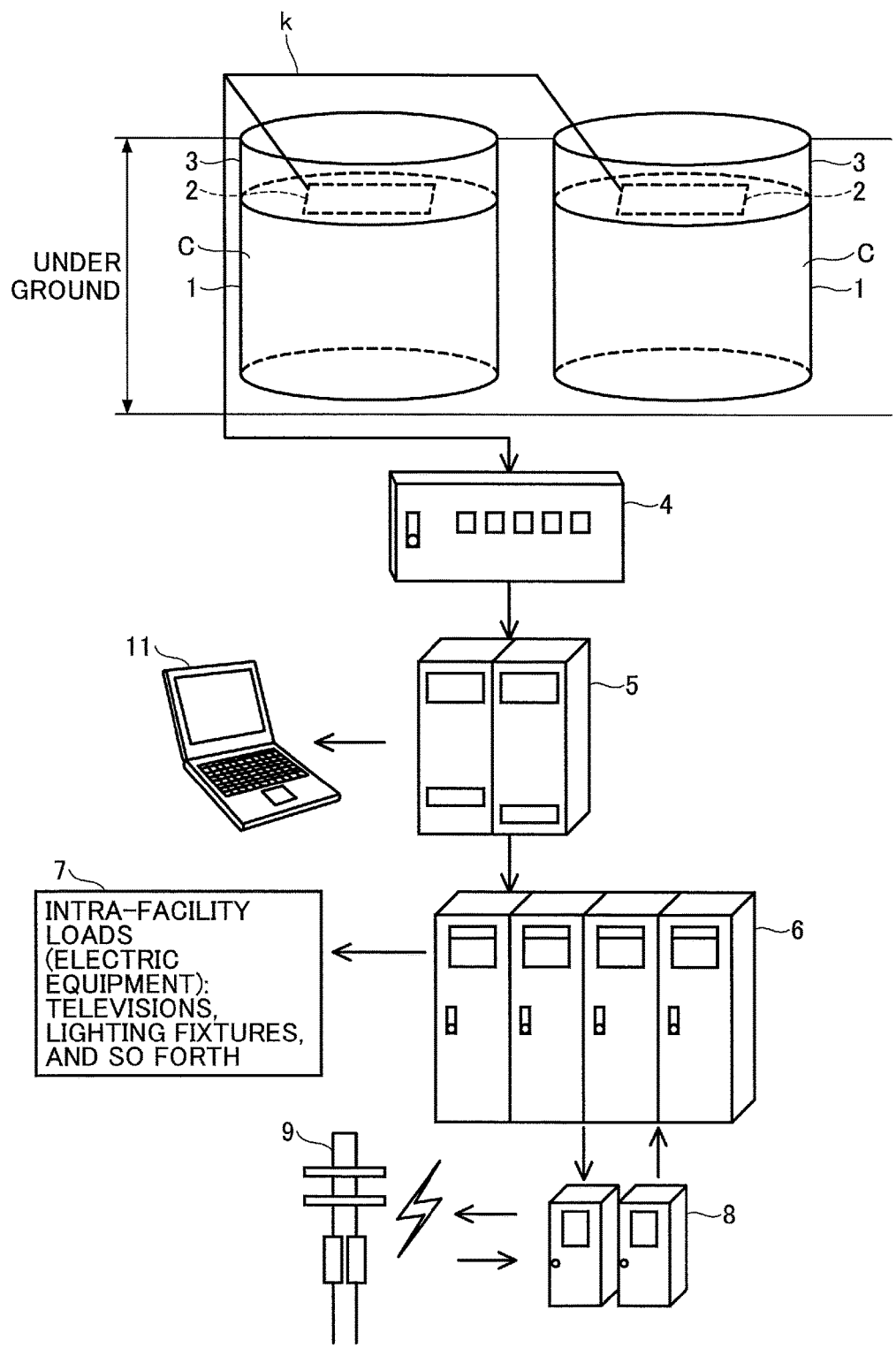
FIG. 19 illustrates a space plasma power generation system using the space plasma power generation arrangement illustrated in FIG. 17.

FIG. 17 illustrates a space plasma power generation arrangement where a power generating device 2 is installed at an electron-collecting unit 1, according to the present embodiment. FIG. 18 illustrates the power generating device 2. FIG. 19 illustrates a space plasma power generation system using the space plasma power generation arrangements illustrated in FIG. 17.

FIG. 17 illustrates a state where an electron-collecting unit 1 where carbon bodies (activated carbon) C have been hardened through a water-binding process has been installed and the power generating device 2 is installed at the electron-collecting unit 1.

For example, in a case of digging a ground surface using a machine, a space having a size of 2,400 mm width by 2,400 mm length by 2,000 mm height is acquired.

Then, a steel-made form (having a diameter of 1,200 mm) is installed in the space. After soil around the steel-made form is compacted with the use of a tamping rod, an electron-collecting unit 1 is installed in the steel-made form. After the installation of the electron-collecting unit 1, the steel-made form is removed.

Next, on the electron-collecting unit 1, a power generating device 2 is installed. Finally, from soil and sand generated when the ground was dug, large stones and trashes or the like are removed. Thus, satisfactory soil and sand 3 that are suitable for compacting and have soil and small stones mixed are selected, to use backfilling a space above the power generating device 2 and above the electron-collecting unit 1.

Space plasma "a", illustrated in FIG. 17 (where a symbol "+" denotes a positive hole, and a symbol "−" denotes an electron), influences weather. Especially, at a time when a thundercloud is generated, space plasma causes electrostatic induction in the atmosphere between a lower part of the thundercloud and the ground.

In response to an electric field of hundreds of millions of volts being generated in the atmosphere, electrons on a ground surface go underground.

The electrons that have been thus underground are normally kept underground. However, after the electron-collecting unit 1 is installed underground as illustrated in FIG. 17, electrons "−" accumulate on the electron-collecting unit 1.

As a result, as illustrated in FIG. 17, the ground surface is filled with positive holes "+" generated as a result of the electrons "−" being removed and accumulating on the electron-collecting unit 1 as mentioned above.

In the space plasma power generation arrangement according to the present embodiment, the power generating device 2 is placed on a top of the electron-collecting unit 1, as described above with reference to FIG. 17. As a result, as illustrated in FIG. 18, the positive holes "+" on the ground surface accumulate on a p-type silicon region "c" made of p-type silicon through upper electrodes "b", while the electrons "−" in the electron-collecting unit 1 accumulate on a n-type silicon region "e" made of n-type silicon through lower electrodes "d".

Therefore, a side of the power generating device 2 near the ground surface is regarded as a positive pole and a side of the electron-collecting unit 1 near the electron-collecting unit 1 is regarded as a negative pole.

As illustrated in FIG. 18, the p-type silicon region "c" is connected with the n-type silicon region "e" as a p-n junction "f". A load "g" is connected between the upper electrode "b" and the lower electrode "d" through an external circuit "k".

As a result, electrons move from the n-type silicon region "d" to the p-type silicon region "c" through the external circuit "k". Thus, a current "h" flows through the external circuit "k" in the reverse direction. As a result of electrons being accumulated on the electron-collecting unit 1, the current "h" can be kept flowing.

This is a principle of space plasma power generation according to the second embodiment.

FIG. 19 illustrates a space plasma power generation system according to the present embodiment.

As illustrated in FIG. 19, the space plasma power generation system uses the electron-collecting units 1 at which the respective power generating devices 2 are installed as described above with reference to FIGS. 17 and 18.

The electric circuits k (including respective leads connected to the upper electrodes "b" and the lower electrodes "d" of the power generating devices 2 as illustrated in FIG. 18) drawn from the power generating devices 2 installed at the electron-collecting units 1 are collected at a connection panel 4.

Thereafter, a power conditioner 5 that converts direct-current power into alternative-current power is used to convert direct-current power from the power generating devices 2 into alternative-current power.

Then, the thus-acquired alternative-current power is transmitted to a power receiving and transmitting equipment 6. In the power receiving and transmitting equipment 6, the power is partially distributed to various electric loads 7 (i.e., examples of the load "g" illustrated in FIG. 18) in a building, while the remaining power is stored.

In addition, thus generated power is transmitted as commercial power (using a power transmission equipment 9) through a watthour meter 8 for measuring buying and selling electric energy.

A situation of the space plasma power generation system is managed by a measuring apparatus 11 (such as a personal computer).

Thus, the electrostatic induction systems for global environmental conservation have been described in the embodiments. However, the present invention is not limited to such specific embodiments. Various modifications and improvements can be made without departing from the scope of the present invention.

The present application is based on Japanese Patent Application No. 2015-134755, filed on Jun. 16, 2015, Japanese Patent Application No. 2017-194661, filed on Sep. 16, 2017, and Japanese Patent Application No. 2017-198030, filed on Sep. 23, 2017. The entire contents of Japanese Patent Application No. 2015-134755, Japanese Patent Application No. 2017-194661, and Japanese Patent Application No. 2017-198030 are hereby incorporated herein by reference.

What is claimed is:

1. An electrostatic induction system for global environmental conservation, the electrostatic induction system comprising:
used activated carbon in a form of electron-collecting units, to which electrons are supplied by an electrostatic induction apparatus so that impurities that have been absorbed by the used activated carbon are neutralized or reduced, and neutralized or reduced used activated carbon is acquired,
wherein
the neutralized or reduced used activated carbon is buried in an environmental conservation implementation area in such a manner that an amount of the buried neutralized or reduced used activated carbon and a number of locations at which the neutralized or reduced used activated carbon are buried are adjusted depending on a property of the environmental conservation implementation area, and that the buried neutralized or reduced used activated carbon gradually decreases an earthing resistance of the environmental conservation implementation area so as to cause the earthing resistance to have a value less than or equal to 10 Ω.

2. The electrostatic induction system as claimed in claim 1, wherein
each of the electron-collecting units is produced as a result of carbon powder of the used activated carbon having an average grain diameter less than or equal to 2 mm being hardened through a water-binding process to have a volume greater than or equal to 2 m$^3$.

3. The electrostatic induction system as claimed in claim 2, further configured to generate electric power with the use of the electron-collecting units.

4. The electrostatic induction system as claimed in claim 3, further comprising:
power generating devices configured to generate electric power, the power generating devices being installed between the electron-collecting units and soil that is generated when the electron-collecting units are buried, the soil being used to backfill spaces above the buried electron-collecting units.

5. The electrostatic induction system as claimed in claim 4, wherein
each of the power generating devices is configured to include
a first region made of p-type silicon; and
a second region made of n-type silicon, the second region being below the first region.

6. The electrostatic induction system as claimed in claim 1, wherein
the used activated carbon is neutralized or reduced as a result of electrons being supplied by the electrostatic induction apparatus to the used activated carbon placed on an insulating device through an earth rod buried in the used activated carbon.

7. The electrostatic induction system as claimed in claim 6, further configured to generate electric power with the use of the electron-collecting units.

8. The electrostatic induction system as claimed in claim 7, further comprising:
power generating devices configured to generate electric power, the power generating devices being installed between the electron-collecting units and soil that is generated when the electron-collecting units are buried, the soil being used to backfill spaces above the buried electron-collecting units.

9. The electrostatic induction system as claimed in claim 8, wherein
each of the power generating devices is configured to include
a first region made of p-type silicon; and
a second region made of n-type silicon, the second region being below the first region.

10. The electrostatic induction system as claimed in claim 1, further comprising:
at least one earth rod that is buried in each of the electron-collecting units,
an earth lead having one end connected with the at least one earth rod and the other end installed in a target facility, and
a metal fence that surrounds the environmental conservation implementation area for irradiating electrons that have been collected at the electron-collecting units so as to reduce an atmosphere around the environmental conservation implementation area.

11. The electrostatic induction system as claimed in claim 1, wherein
the electron-collecting units that include such an amount of the neutralized or reduced used activated carbon as to gradually decrease the earthing resistance to have a value less than or equal to 10Ω are installed in a radioactive material contaminated area at regular intervals in such a manner that respective radioactive material neutralizing ranges of the electron-collecting units are adjacent to or overlap with one another, for receiving electrons that have been underground due to electrostatic induction caused between a lower part of a cloud and a ground surface, to use the received electrons to neutralize unstable atomic nucleuses included in a radioactive material.

12. The electrostatic induction system as claimed in claim 11, wherein
the electron-collecting units each having a volume in a range between 2 m$^3$ and 3 m$^3$ are installed at intervals each in a range between 10 m and 30 m in the radioactive material contaminated area in such a manner that the respective radioactive material neutralizing ranges of the electron-collecting units are adjacent to or overlap with one another, and that a total volume of the electron-collecting units included in an area of 1000 m$^2$ of the radioactive material contaminated area is greater than or equal to 5 m$^3$.

13. The electrostatic induction system as claimed in claim 11, further comprising:
a metal fence that is installed in the radioactive material contaminated area for irradiating electrons that have been collected at the buried neutralized or reduced used activated carbon so as to neutralize or reduce a gas generated from the radioactive material.

14. The electrostatic induction system as claimed in claim 12, further comprising:
a metal fence that is installed in the radioactive material contaminated area for irradiating electrons that have been collected at the buried neutralized or reduced used activated carbon so as to neutralize or reduce a gas generated from the radioactive material.

15. The electrostatic induction system as claimed in claim 1, further configured to generate electric power with the use of the electron-collecting units.

16. The electrostatic induction system as claimed in claim 15, further comprising:
power generating devices configured to generate electric power, the power generating devices being installed between the electron-collecting units and soil that is generated when the electron-collecting units are buried, the soil being used to backfill spaces above the buried electron-collecting units.

17. The electrostatic induction system as claimed in claim 16, wherein
each of the power generating devices is configured to include
a first region made of p-type silicon; and a second region made of n-type silicon, the second region being below the first region.

18. The electrostatic induction system as claimed in claim 1, wherein
the electron-collecting units supply electrons to a ground surface so as to prevent electric lines of force from being connected between a thundercloud and the ground surface, to avoid a lightning strike.

19. The electrostatic induction system as claimed in claim 1, wherein
the electron-collecting units supply electrons to a seismic wave so as to control the seismic wave.

* * * * *